(12) United States Patent
Akiyama

(10) Patent No.: US 6,984,955 B2
(45) Date of Patent: Jan. 10, 2006

(54) MOTOR CONTROL DEVICE

(75) Inventor: Shigeki Akiyama, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 11/033,123

(22) Filed: Jan. 12, 2005

(65) Prior Publication Data
US 2005/0151500 A1 Jul. 14, 2005

(30) Foreign Application Priority Data
Jan. 14, 2004 (JP) .............................. 2004-007268

(51) Int. Cl.
G05F 1/10 (2006.01)
(52) U.S. Cl. ...................... 318/650; 318/560; 318/561; 318/566; 318/569; 318/600
(58) Field of Classification Search ........ 318/560–567, 318/569, 600, 650; 700/1–245; 901/1
See application file for complete search history.

(56) References Cited

U.S. PATENT DOCUMENTS

| 4,593,237 A | * | 6/1986 | Tanaka ........................ 318/561 |
| 4,774,446 A | * | 9/1988 | Salazar et al. .............. 318/561 |
| 5,267,144 A | * | 11/1993 | Yoshida et al. ............... 700/69 |
| 5,587,633 A | * | 12/1996 | Aoki et al. .................. 318/164 |
| 5,710,497 A | * | 1/1998 | Yanagimachi ............... 318/632 |
| 6,353,301 B1 | * | 3/2002 | Niwa ........................ 318/569 |
| 6,418,274 B2 | * | 7/2002 | Tanaka ...................... 388/800 |
| 6,459,225 B1 | * | 10/2002 | Maruyama .................. 318/560 |
| 6,541,934 B1 | * | 4/2003 | Hirschfelder et al. ....... 318/609 |
| 6,590,359 B2 | * | 7/2003 | Kaufhold et al. ........... 318/562 |
| 6,608,459 B2 | * | 8/2003 | Kasagami et al. .......... 318/560 |
| 6,713,983 B2 | * | 3/2004 | Maruyama .................. 318/560 |
| 6,741,055 B2 | * | 5/2004 | Kurokawa et al. .......... 318/560 |
| 6,744,233 B1 | * | 6/2004 | Tsutsui ....................... 318/560 |
| 6,809,489 B1 | * | 10/2004 | Yoshida et al. ............. 318/560 |
| 6,856,854 B2 | * | 2/2005 | Endo et al. ................. 700/186 |
| 6,889,115 B2 | * | 5/2005 | Shiba et al. ................ 700/186 |
| 2004/0052565 A1 | | 3/2004 | Takeishi et al. |

FOREIGN PATENT DOCUMENTS

| JP | 3102792 | 8/2000 |
| JP | 2001-273005 | 10/2001 |
| JP | 2003-023783 | 1/2003 |

* cited by examiner

Primary Examiner—Marlon T. Fletcher
Assistant Examiner—Tyrone Smith
(74) Attorney, Agent, or Firm—Oliff & Berridge, PLC

(57) ABSTRACT

In a motor control device controlling a motor by a state feedback control, high control accuracy is maintained regardless of fluctuations in a motor load so as to improve control performance of the state feedback control. A control signal (manipulation amount) outputted from a feedback calculator for controlling the motor is compared to a manipulation threshold set to a manipulation threshold setting register so as to determine the magnitude of a load amount of the motor. The feedback calculator includes an observer and performs the state feedback control of the motor. When the load amount is in normal level, a normal load observer matrix set in an observer table is selected to configure a normal load observer. When the load amount is increased, a high load observer matrix is selected to configure a high load observer.

17 Claims, 22 Drawing Sheets

NORMAL RESPONSE

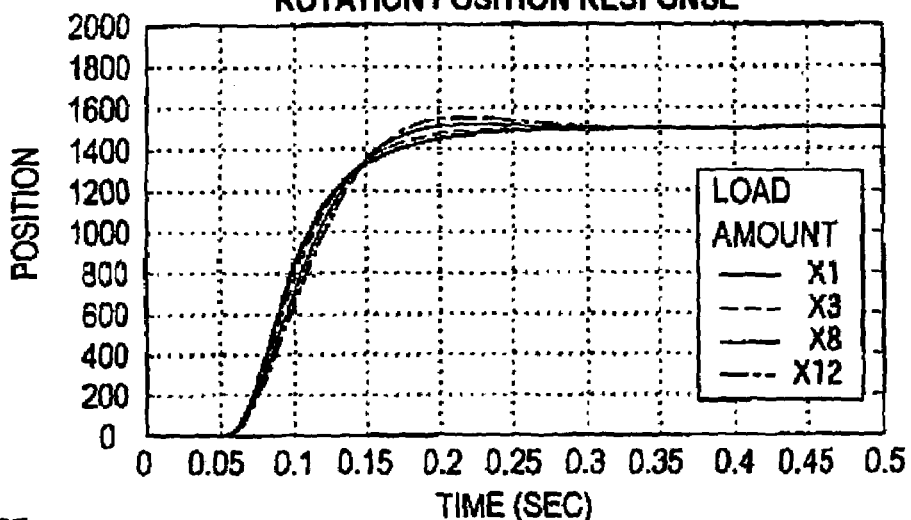
FIG. 8A RESPONSE WHEN LOAD IS CHANGED IN SAME OBSERVER
ROTATION POSITION RESPONSE
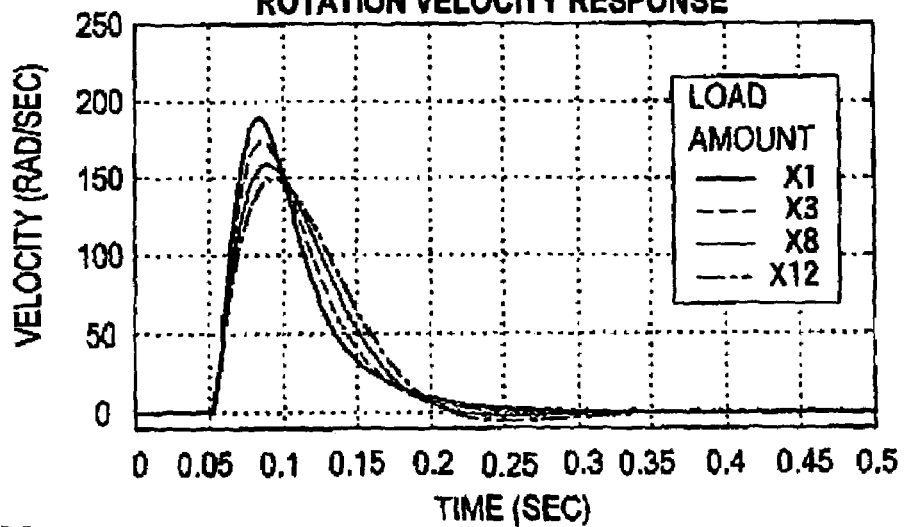
FIG. 8B ROTATION VELOCITY RESPONSE
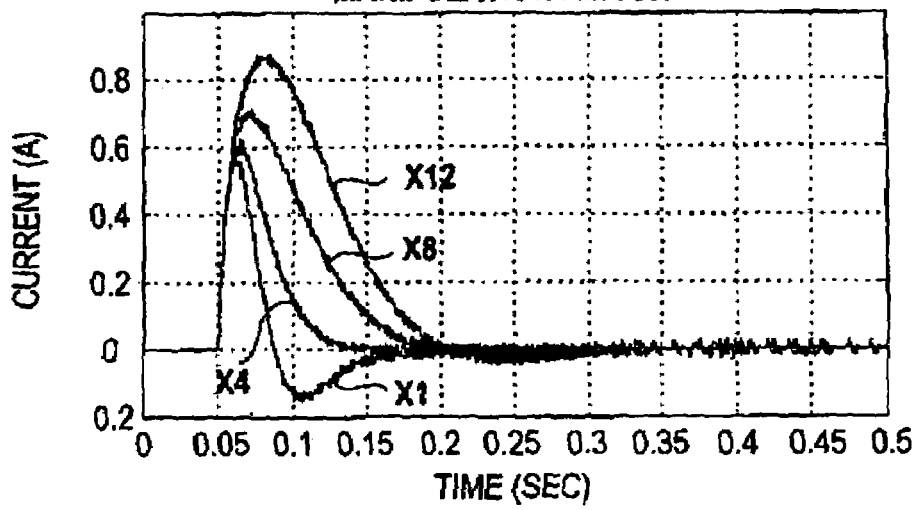
FIG. 8C MANIPULATION AMOUNT RESPONSE WHEN OBSERVER IS SWICHED TO HIGH LOAD DUE TO LOAD INCREASE
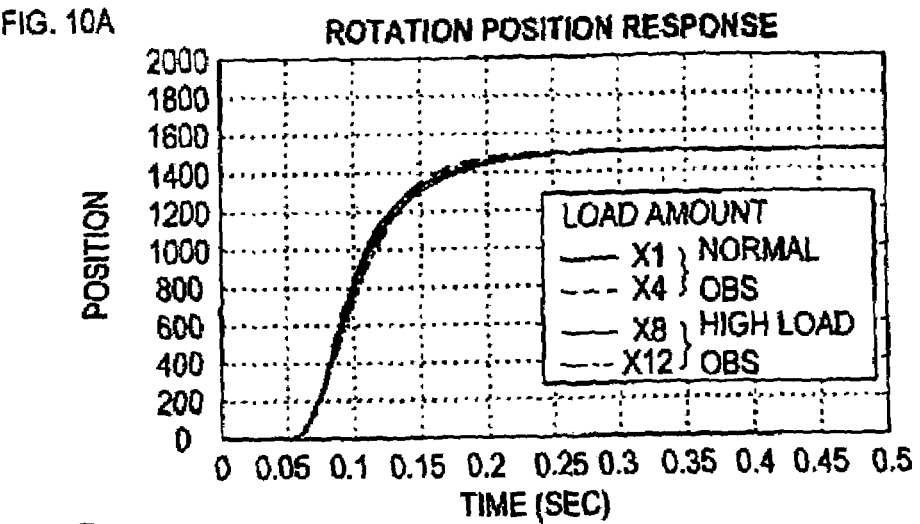
FIG. 10A ROTATION POSITION RESPONSE
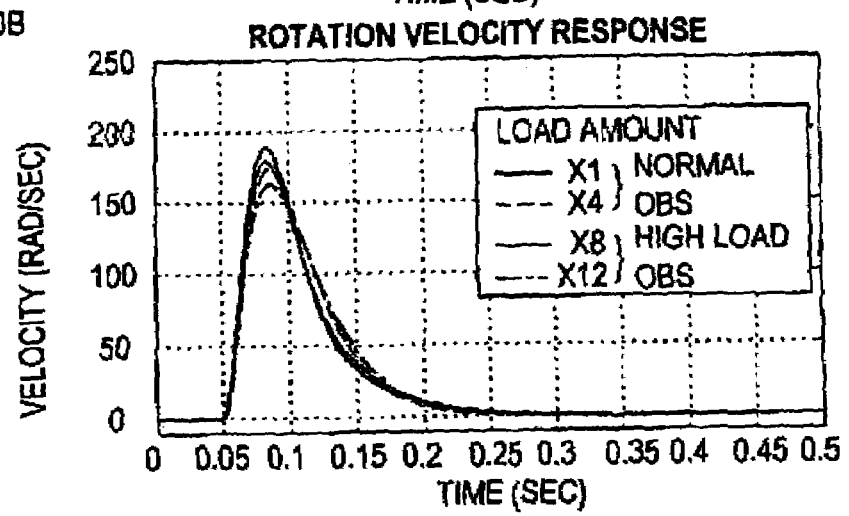
FIG. 10B ROTATION VELOCITY RESPONSE
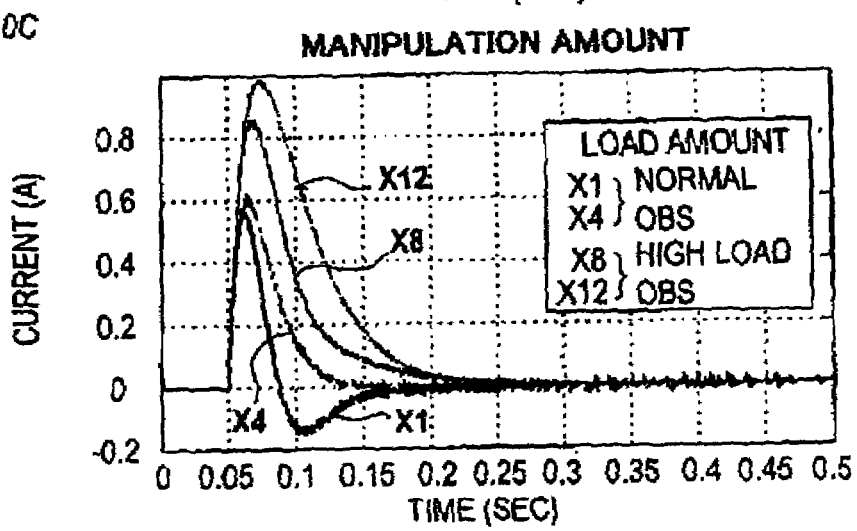
FIG. 10C MANIPULATION AMOUNT

RESPONSE WHEN OBSERVER AND GAIN ARE SWITCHED TO HIGH LOAD DUE TO LOAD INCREASE

RESPONSE TO LOAD DECREASE AFTER OBSERVER AND GAIN ARE SWICHED TO HIGH LOAD

MOTOR CONTROL DEVICE

BACKGROUND OF THE INVENTION i) Technical Field of the Invention

This invention relates to a control device of a motor, which estimates an operating state of a control target using a state estimator (observer), for example, and controls the motor by a feedback control based on the estimation.

ii) Description of the Related Art

Heretofore, an image forming apparatus, such as a printer and a facsimile, has been provided with a conveying device that conveys a sheet fed by a feeding device, as an image forming by an image forming unit, like a record head, onto the sheet proceeds. This type of conveying device comprises a conveying roller that is brought into frictional contact with the sheet to convey the same, and a driving source, such as a motor, that rotationally drives the conveying roller. The conveying device regulates a rotation amount of the conveying roller according to operating instructions to convey the sheet from the outside. As the sheet is conveyed by the conveying roller, an image is recorded onto the sheet by the image forming unit.

Conventionally, the driving source that rotationally drives the conveying roller in such a conveying device has been a stepping motor. However, the stepping motor rotates itself by a predetermined step angle according to a received pulse signal. Therefore, it is difficult to pursue both high speeding and high resolution. Furthermore, due to its specific operational characteristics, it has been very difficult to reduce noise during the operation.

These days, owing to an increase in demands for high speeding, high resolution, as well as silence, in the image forming apparatus, a DC motor becomes dominant as the driving source that rotationally drives the conveying roller. For example, the DC motor is used as a feeding motor and a carriage motor in an ink jet printer.

Japanese Patent Publication No. 2003-23783 discloses an ink jet printer which performs switching of a gain according to a driving load of a DC motor at the time of feedback controlling the DC motor. Thereby, a time period required for the DC motor to reach a predetermined rotation velocity becomes constant regardless of a magnitude of the driving load of the DC motor.

SUMMARY OF THE INVENTION

However, only switching the gain according to the driving load of the DC motor, as in the above disclosure, may cause deterioration in control performance in a case where there is a sharp fluctuation in the driving load. Therefore, in recent years, the image forming apparatus using the DC motor adopts the feedback control (hereafter referred to as "state feedback control") using a state estimator (observer), in order to improve control accuracy in motor driving. According to the feedback control, if the state estimator is adapted to a predetermined control target beforehand, all the state quantities representing the operating states of the control target can be reflected in the feedback control. Thus, high control accuracy is achieved as compared to the case of mere switching of the gain.

However, a significant change in the load of the DC motor that drives the control target, due to a fluctuation of environment or aging of the control target, may generate a gap between the actual operating state of the control target and the operating state estimated by the state estimator. There is a fear that the control performance may be lowered.

In a general state estimator, the load of the DC motor in a normal state (that is, in a normal operating environment under normal operating conditions) of the control target is set to be a design load value. When the load of the DC motor is in the design load value, the operating state of the control target is estimated. Therefore, if the rotation of the DC motor is transmitted to the conveying roller by a driving force transmission belt so as to rotationally drive the conveying roller, for example, changes in viscosity of grease in a roller shaft or in hardness of the driving force transmission belt as a result of fluctuations in the ambient temperature or aging, may cause the load of the DC motor to differ from the design load value.

One object of the present invention is to improve the control performance of a state feedback control by maintaining high control accuracy notwithstanding fluctuations in the motor load of a motor control device that controls the motor by the state feedback control.

In order to attain the above object, the present invention provides a motor control device comprising: a target setting unit that sets a target operation amount of a DC motor or a driving target driven by the DC motor; a detecting unit that detects an actual operation amount corresponding to the target operation amount, of the DC motor or the driving target; and a controlling unit that controls the DC motor by calculating a manipulation amount of the DC motor required to conform the actual operation amount to the target operation amount and outputting a control signal which indicates the manipulation amount to the DC motor. In the above motor control device, a plurality of load levels are provided in a fluctuation range of an estimated load amount of the DC motor. A corresponding estimation unit is provided for each load level. Each estimation unit estimates a state quantity indicating an operating state of at least one of the DC motor or the driving target based on the actual operation amount detected by the detecting unit and the calculated manipulation amount, assuming that the load amount of the DC motor belongs to the corresponding load level.

The motor control device further comprises a switching unit that obtains actual load information indicating an actual load amount of the DC motor in a direct or indirect manner. The switching unit selectively performs switching to one of the estimation units, which is provided for the load level corresponding to the load amount indicated by the actual load information. The controlling unit calculates the manipulation amount based on the target operation amount, the actual operation amount, and the state quantity estimated by the estimation unit selected by the switching unit.

In other words, in, the present invention, not a single estimation unit as before but a plurality of estimation units are provided depending on the load mount of the DC motor. One of the estimation units is selectively used according to the load amount during the drive of the DC motor. For example, if the load amount should fluctuate in a range from 0 to b, the fluctuation range is divided into a plurality of load levels (into three levels, for example from 0 to a1, a1 to a2, and a2 to b). A corresponding estimation unit is provided for each load level. Each estimation unit is configured so that the state quantity can be accurately estimated when the load amount of the DC motor is in the corresponding load level. In this manner, when the load level is in the a1 to a2 level (i.e., in a range from a1 to a2), for example, selection of the estimation unit provided for the load level allows precise estimation of the state quantity. Furthermore, the proper control of the DC motor becomes possible which corresponds to the load level of a1 to a2.

The actual load information may directly indicate the actual load amount. Or, the actual load information may be a physical quantity which is changed as the load amount of the DC motor is changed (conversely, physical quantity which may cause the load amount to change). The information should allow the estimation of the load level, that is, indirectly show the actual load amount and allow the estimation of a tendency of the changes in the load amount.

According to the motor control device configured as above, high control accuracy can be maintained without taking into account the fluctuations in motor load. Deterioration of the control performance can be avoided in the DC motor using the estimation units.

A rotary encoder or a linear encoder may be used for the detecting unit that detects the actual operation amount of the DC motor or the driving target. In this case, a count value of the encoder signal is detected as the detection signal representing the actual operation amount of the DC motor or the driving target. Also, a control signal from the controlling unit may be inputted to the DC motor directly, or indirectly via a driving circuit which drives the DC motor.

The switching unit may comprise a load level determination unit that determines which one of the plurality of load levels the load amount indicated by the actual load information belongs to. The switching unit performs switching to the target estimation unit provided for the load level which it is determined by the load level determination unit the load amount belongs to. The motor control device including the switching unit as configured above allows more precise selection/switching of the estimation unit.

In the aforementioned switching of the estimation unit according to the load amount of the DC motor, the larger the load amount becomes, the larger the manipulation amount becomes. However, there may be cases in which an increase in the manipulation amount is not preferred.

On the other hand, in the control of the DC motor by the controlling unit (so-called feedback control), the control gain is normally used for calculating the manipulation amount. For example, a predetermined control gain is multiplied by the state quantity estimated by the estimation unit. Or, the predetermined control gain is multiplied by a deviation between the target operation amount and the actual operation amount. Accordingly, in order to control the increase in the manipulation amount, it is preferable that the control gain may be switched as well at the time of switching the estimation unit.

That is, a corresponding control gain used when the controlling unit calculates the manipulation amount may be provided for each estimation unit. The controlling unit is designed to use one of the control gains to calculate the manipulation amount. The switching unit, when performing switching to the target estimation unit, also performs switching of the control gain for use by the controlling unit to the target control gain provided for the target estimation unit.

There are various options for what to use as the actual load information. For example, in the case of using the manipulation amount as the actual load information, it is noted that, generally, as the load amount becomes larger, the manipulation amount also becomes larger, and as the load amount becomes smaller, the manipulation amount also becomes smaller. In other words, the actual load amount of the DC motor can be estimated based on the manipulation amount calculated by the controlling unit.

Accordingly, in the motor control device of the present invention, it is preferable that the actual load information is the manipulation amount. Furthermore, it is preferable that a manipulation threshold is provided for each border section between the two adjacent load levels, so that whether there is a shift of the load level which the load amount of the DC motor belongs to can be determined based on the manipulation amount. The load level determination unit may compare the manipulation amount calculated in the controlling unit and the respective manipulation thresholds so as to perform the determination on which load level the load amount of the DC motor belongs to.

According to the motor control device as above, switching of the estimation unit (and switching of the control gain) is performed based on comparison between the actual manipulation amount during the operation of the DC motor and the manipulation thresholds. Therefore, deterioration of the control performance can be inhibited in a more assured manner.

Other than setting the manipulation thresholds for the respective border sections as above, for example, it is also possible to provide only a single manipulation threshold. In this case, a respective threshold for a period in which the manipulation amount exceeds the manipulation threshold is also provided per each load level. In other words, the load level of the DC motor is determined based on a length of period in which the manipulation amount exceeds the manipulation threshold. Switching to the estimation unit corresponding to the load level is then performed. In this manner as well, the same effect as above can be obtained.

The load level determination unit, which performs only the switching of the estimation unit, may comprise a manipulation amount determination unit that determines whether the manipulation amount exceeds the manipulation threshold provided for the border section between the load level of the currently selected estimation unit and the adjacent upper or lower load level, a timing unit that times, per each preset determination period, a period in which it is determined by the manipulation amount determination unit that the manipulation amount exceeds the manipulation threshold, and a timing determination unit that determines that the load amount corresponds to the upper load level when the period timed by the timing unit is equal to or more than a predetermined switching determination time, or to the lower load level when the period timed by the timing unit is less than a predetermined switching determination time.

In other words, an instant increase or decrease of the manipulation amount is not determined as an increase or decrease of the load amount, but an increase or decrease that persists for a predetermined period (switching determination time) in the preset determination period is considered as an increase or decrease of the load amount. The load level is then determined to be switched to the upper or lower load level. Therefore, erroneous determination can be avoided which may be caused by a sudden change in the manipulation amount due to some factor like noise or an instantaneous change in the load amount.

Timing by the timing unit in which the manipulation amount exceeds the manipulation threshold may be performed in a continuous manner or in an accumulated manner. That is, in the case of timing in a continuous manner, the period is reset every time the manipulation amount lowers the manipulation threshold even a little during the timing. In the case of timing in an accumulated manner, the timed period is retained even if the manipulation amount temporarily lowers the manipulation threshold. When the manipulation amount exceeds the manipulation threshold again timing is restarted by setting the retained timed period to an initial value.

However, in the case of timing in a continuous manner, the timed period is reset every time the manipulation amount instantaneously lowers the manipulation threshold due to noise or any other factor, as previously mentioned. As a result, switching of the estimation units is not performed even if the load level is shifted. Therefore, it is preferable that the timing unit performs timing in an accumulated manner in the determination period.

Moreover, there may be cases in which, only during a particular determination period, the manipulation amount exceeds the manipulation threshold due to noise or an accidental change in the load amount. Therefore, it is very dangerous to quickly determine that the load level is shifted to the higher or lower level because the period timed during a single determination period exceeds the switching determination time. This may result in erroneous determination.

Accordingly, it is preferable that the timing determination unit determines whether the timed period exceeds the switching determination time for every determination period. When the number of times which it is determined that the timed period exceeds the switching determination time is equal to or more than a predetermined switching determination number, the timing determination unit determines that the load amount belongs to the upper load level, or when the number of times at which it is determined that the timed period exceeds the switching determination time is less than a predetermined switching determination number, the timing determination unit determines that the load amount belongs to the lower load level.

In this manner, unintended switching of the load level can be avoided, for example, which results from an increase in the manipulation amount duo to malfunction such as paper jamming at the time of rotationally driving a sheet conveying roller of an image forming apparatus.

In the motor control device in which not only the estimation unit but also the control gain is switched, an increase of the manipulation amount can be more effectively inhibited as compared to the case of merely switching the estimation unit. However, this means that the proper determination of the load level is not possible using the same manipulation threshold before and after the switching of the estimation unit and the control gain.

Accordingly, it is preferable that, in the motor control device in which both the estimation unit and the control gain are switched, each manipulation threshold is composed of an upper threshold for determining that the load level which the load amount belongs to has moved up one level and a lower threshold, that is smaller than the upper threshold by a predetermined amount, for determining that the load level has moved down one level.

In the above case, the load level determination unit comprises an increase determination unit that determines whether the manipulation amount exceeds the upper threshold provided for the border section between the load level corresponding to the currently selected estimation unit and the adjacent upper load level, a decrease determination unit that determines whether the manipulation amount exceeds the lower threshold provided for the border section between the load level corresponding to the currently selected estimation unit and the adjacent lower load level, a timing unit that times, per the preset determination period, one of an upper period in which the increase determination unit determines that the manipulation amount exceeds the upper threshold and a lower period in which the decrease determination unit determines that the manipulation amount exceeds the lower threshold, and a timing determination unit that determines that the load amount belongs to the upper load level when the upper period timed by the timing unit is equal to or more than a predetermined upper switching period, and that the load amount belongs to the lower load level when the lower period timed by the timing unit is less than a predetermined lower switching period.

As above, two thresholds, i.e., upper threshold and lower threshold, are separately provided to respectively determine an ascent or descent of the load level. The upper threshold is set larger than the lower threshold. As a result, for example, even if the estimation unit and the control gain are both switched and the manipulation amount is lowered because the load level is raised and the manipulation amount exceeds the upper threshold for more than the upper switching period, whether the load level is lowered after the switching is determined based on the lower threshold. Accordingly, the proper determination of both rise and fall of the load level becomes possible.

In the above case as well, the period in which the manipulation amount exceeds the upper threshold or lower threshold can be timed by the timing unit in a continuous manner or in an accumulated manner. However, for the reasons previously mentioned, it is preferable that the timing by the timing unit is performed in an accumulated manner in the determination period.

Moreover, it is also preferable that the timing determination unit determines, per the determination period, one of whether the timed period is equal to or more than the upper switching period and whether the timed period is equal to or more than the lower switching period. When the number of times it is determined that the timed period is equal to or more than the upper switching period, is no loss than a predetermined switching determination number, the timing determination unit determines that the load amount belongs to the upper load level. When the number of times it is determined that the timed period is less than the lower switching period, is no less than a predetermined switching determination number, the timing determination period determines that the load amount belongs to the lower load level.

In this manner, changes in the load amount (shift of the load level) can be precisely determined. Highly accurate control performance of the DC motor can be maintained without taking into account the fluctuations in motor load.

It is preferable that the determination period is a period in which a predetermined unit operation is performed from a start to a stop of the driving target when the driving target is driven by the DC motor. An example of the unit operation is a sequential drive of the DC motor with the positioning of the driving target by a predetermined amount, particularly a sequential move of a sheet in a secondary direction by a predetermined amount in a progress of an image forming onto the sheet.

In the above manner, even if there is a fluctuation in the load amount, deterioration of the control performance can be avoided in the respective unit operations. Furthermore, high control accuracy can be achieved throughout the whole operation of the driving target. Switching of the estimated device (and the control gain) may be performed during the unit operation, based on the determination by the timing determination unit during the unit operation. However, such a switching during the unit operation may cause the instability in control. Therefore, it is desirable that the switching is performed after the unit operation in which it is determined that the switching should be performed and before the next unit operation.

The present motor control device may comprise a temperature detecting unit that detects an ambient temperature of the driving target as the actual load information. A corresponding temperature threshold is provided for each border section of the two adjacent load levels, so that whether there is a shift of the load level which the load amount of the DC motor belongs to can be determined based on the ambient temperature. The load level determination unit compares the ambient temperature detected by the temperature detecting unit to the respective temperature thresholds so as to perform the determination on which load level the load amount of the DC motor belongs to.

As previously mentioned, changes in the ambient temperature may lead to changes in viscosity of grease in a rotation shaft of the driving target, for example, in the case that the driving target is a rotator. Or, there may be changes in hardness of a driving force transmission belt, for example, in the case that a rotational driving force of the DC motor is transmitted to the driving target by the driving force transmission belt made of rubber. There is a possibility of changes in the load amount of the DC motor, although there is a difference in degree depending on a transmission manner of the driving force to the driving target or a structure of the driving target.

Accordingly, if the motor control device is designed to estimate the load amount (load level) of the DC motor by detecting the ambient temperature and switch the estimation unit (and the control gain) according to the estimated load amount, the proper control becomes possible that corresponds to the fluctuations in the load amount. Furthermore, deterioration of the control performance can be inhibited.

The present invention can be applied to the driving target of the DC motor that is rotated or linearly driven. The present invention works significantly well if the driving target is a rotator, the target operation amount is the target rotation amount of the rotator, and the actual operation amount is the actual rotation amount of the rotator.

BRIEF DESCRIPTION OF THE DRAWINGS

The invention will now be described below, by way of example, with reference to the accompanying drawings, in which:

FIGS. 8A, 8B, and 8C are graphs showing changes in the various control responses in a case that the load amount of the motor is increased in the first embodiment;

FIGS. 10A, 10B, and 10C are graphs showing changes in the various control responses in a case that the observer is switched due to an increase in the load amount in the first embodiment;

DETAILED DESCRIPTION OF THE PREFERRED EMBODIMENT

[First Embodiment]

Figure 1:
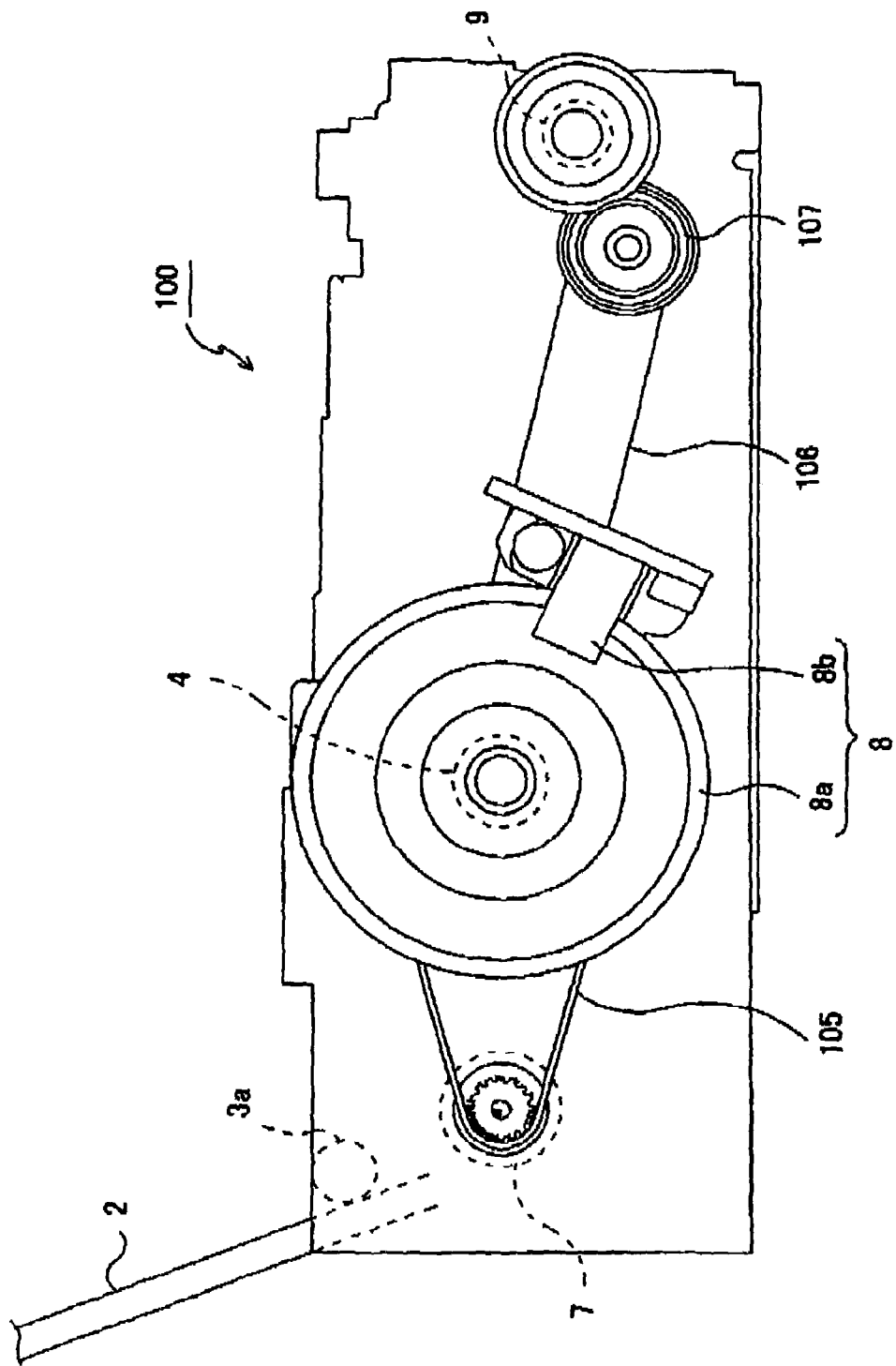
FIG. 1 is a side view of a printer of embodiments of the present invention.

Referring to FIG. 1, a printer 100 of the present embodiment mainly comprises a sheet storing board 2 that stores stacked sheets for recording, a feeding roller 3a that delivers the sheets stacked on the sheet storing board 2 one by one, a conveying roller 4 that conveys the sheet delivered by the feeding roller 3a at the time of recording, a discharge roller 9 that assists sheet conveyance during the recording and discharges the sheet after completion of the recording, an LF (Line Feed) motor 7 that is a rotary drive source of the feeding roller 3a, the conveying roller 4 and the discharge roller 9, and a rotary encoder 8 (hereafter, referred to as an "encoder") constituted of a rotary slit board 8a that rotates with rotation of the conveying roller 4 and a photo interrupter 8b. The LF motor 7 (hereafter, referred to as a "motor") is a DC motor.

The motor 7 rotates the conveying roller 4 and the rotary slit board 8a via a belt 105 connecting the motor 7 and a driving pulley (not shown) that drives the conveying roller 4. Also, the motor 7 rotates the discharge roller 9 by rotating an idle roller 107 via a belt 106 connecting the driving pulley and the idle roller 107. Moreover, rotation of the motor 7 is transmitted to the feed roller 3a via a not shown driving force transmission mechanism so as to rotate the feed roller 3a.

The encoder 8 outputs a pulse signal every time the rotary slit board 8a is rotated by a predetermined angle. Slits are formed at a predetermined interval along the circumference of the rotary slit board 8a. The rotary slit board 8a is rotated coaxially with the conveying roller 4. The conveying roller 4 is rotated by the motor 7. The rotation of the motor 7 is also transmitted to the feeding roller 3a. Accordingly, it is possible to detect not only the rotation amount of the motor 7, but also the rotation amounts of the conveying roller 4 and the feeding roller 3a, and the moving amount of the sheet conveyed by the conveying roller 4, by detecting and counting the pulse signal outputted from the encoder 8.

Figure 2:
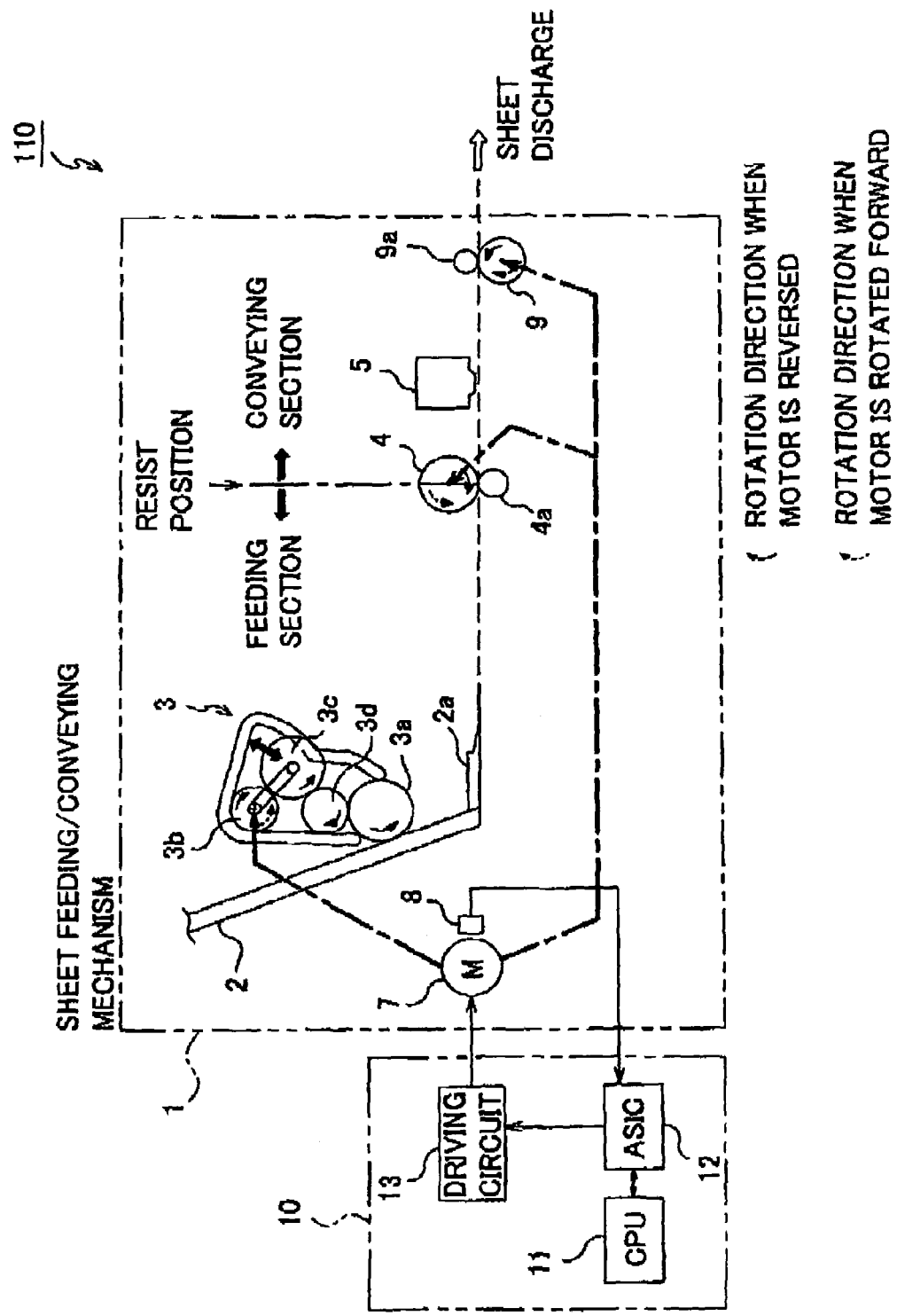
FIG. 2 is an explanatory view showing a schematic constitution of a sheet feeding/conveying apparatus mounted on the printer of the embodiments.

A sheet feeding/conveying apparatus 110 mounted on the printer 100 is described by way of FIG. 2. The sheet feeding/conveying apparatus 110 in FIG. 2 describes the printer 100 in FIG. 1 in more detail and diagrammatically from the viewpoint of sheet delivery, conveyance and discharge. Accordingly, the same reference numbers are given to the same components as the components described in FIG. 1, and the descriptions thereof are not repeated.

As shown in FIG. 2, the sheet feeding/conveying apparatus 110 of the present embodiment essentially comprises a sheet feeding/conveying mechanism 1, and a motor control device 10 including a CPU 11, an ASIC (Application Specific Integrated Circuit) 12, and a driving circuit 13.

The sheet feeding/conveying mechanism 1 includes a sheet separating mechanism 3. The sheet separating mechanism 3 draws out and delivers the sheets stacked on the paper storing board 2 one by one. A bank 2a is provided at the lowest part of the paper storing board 2.

The paper separation mechanism 8 is designed in such a manner that the feeding roller 3a is brought into contact with the top surface of the stacked sheets, and the top most sheet of the stacked sheets is delivered toward the bank 2a as a result of counterclockwise rotation of the feeding roller 3a. The paper separation mechanism 3 comprises a sun gear 3b that receives a rotary driving force transmitted from the motor 7 via a driving force transmission mechanism (not shown), a planet gear 3c that can be moved along the circumference of the sun gear 3b, and a driven gear 3d that is rotated by the planet gear 3c.

When the motor 7 is reversed, the sun gear 3b receives the rotary driving force of the motor 7 and rotates in a clockwise direction. Then, the planet gear 3c is moved to a position shown in FIG. 2. Thereby, the planet gear 3c and the driven gear 3d are engaged. The rotary driving force of the sun gear 3b in a clockwise direction is transmitted to the feeding roller 3a via the planet gear 3c and the driven gear 3d. Consequently, the feeding roller 3a rotates in a counterclockwise direction, takes out one sheet from the stack on the paper storing board 2, and transmits the sheet toward a direction of the bank 2a.

On the other hand, when the motor 7 is rotated forward, the sun gear 3b receives the rotary driving force of the motor 7 and rotates in a counterclockwise direction. Then, the planet gear 3c moves in a direction of the two headed arrow shown in FIG. 2 so as to be disengaged from the driven gear 3d. Thereby, the rotary driving force of the motor 7 is not transmitted to the feeding roller 3a. The feeding roller 3a does not rotate.

As explained in FIG. 1, the rotary driving force of the motor 7 is also transmitted to the conveying roller 4 and the discharge roller 9. While the motor 7 is reversed (i.e., while the feeding roller 3a is rotated), the conveying roller 4 rotates in a clockwise direction, and the discharge roller 9 rotates in a counterclockwise direction. While the motor 7 is rotated forward (i.e., the feeding roller 3a is not rotated), the conveying roller 4 is rotated in a counterclockwise direction, and the discharge roller 9 is rotated in the clockwise direction.

A pinch roller 4a is brought into pressure contact with the conveying roller 4. A spur 9a is brought into pressure contact with the discharge roller 9. The sheet passes respective pressure contact points therebetween. After the recordation by a record head 5 provided between the conveying roller 4 and the discharge roller 9, the sheet is discharged from the pressure contact point between the discharge roller 9 and the spur 9a.

The bank (separation part) 2a supports lower ends of the sheets stacked on the sheet storing board 2. As the feeding roller 3a is rotated, one sheet of the stack is separated and drawn out from the bank 2a. The drawn sheet is delivered to a right direction along a path shown with the dotted line. In the description hereafter, a section from where the sheet is taken out from the sheet storing board 2 to the pressure contact point between the conveying roller 4 and the pinch roller 4a (i.e., a resist position) is called a feeding section. A section from the resist position to where the recording operation by the record head 5 is terminated is called a conveying section.

Figure 3:
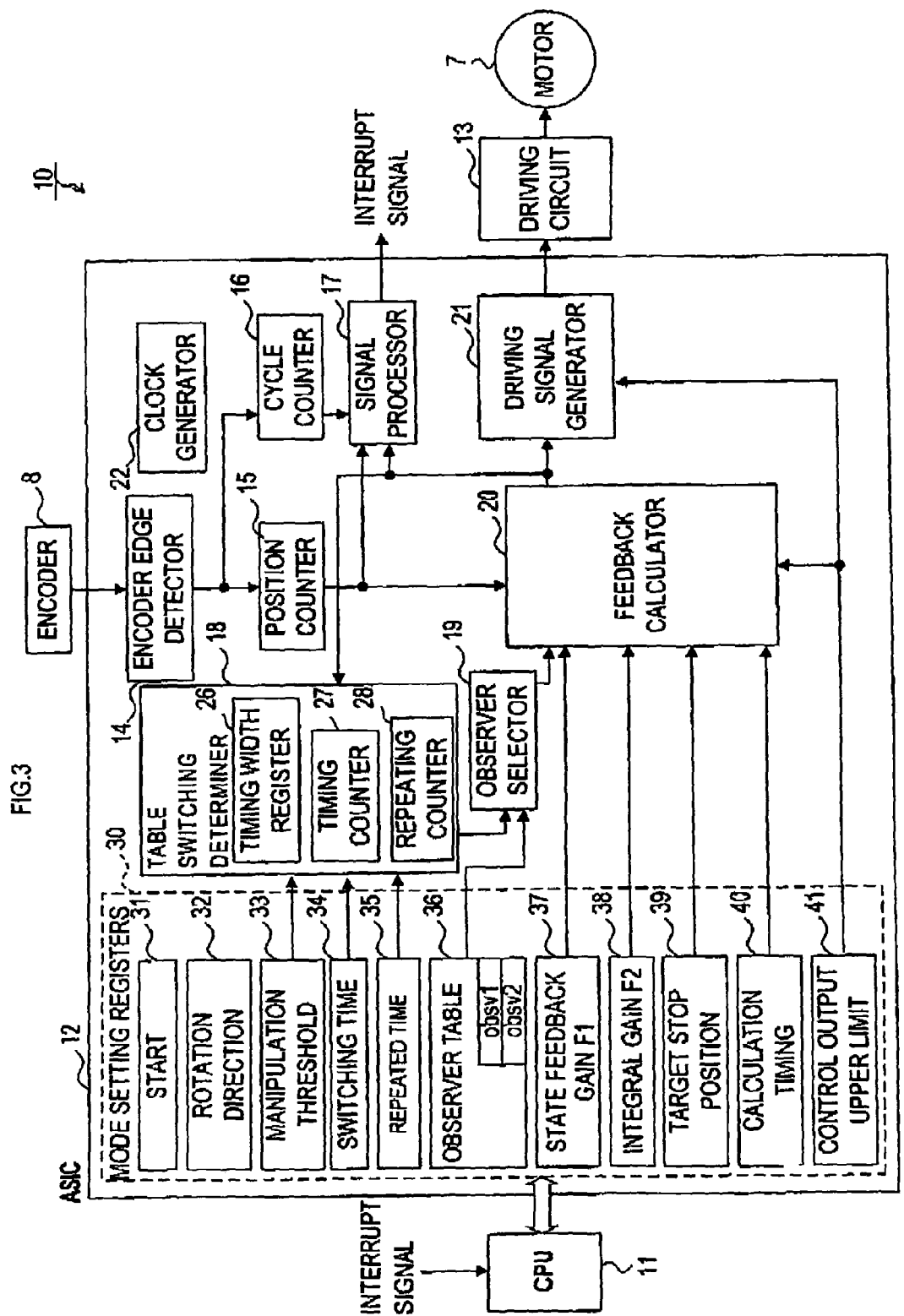
FIG. 3 is a block diagram showing a schematic constitution of a motor control device according to a first embodiment.

A motor control device 10 that controls the operation of the sheet feeding/conveying mechanism 1 is explained by way of FIG. 3. In the explanation hereafter, only the control at the time of conveying the sheet in the conveying section is explained. Accordingly, FIG. 3 shows merely the components necessary for motor control of the motor control device 10.

In the conveying section of the present embodiment, the sheet is sequentially forwarded in a secondary direction (i.e., a transfer direction of the sheet) by a predetermined amount. Particularly, when recording for one path is performed in a primary direction (i.e., direction orthogonal to the conveying direction of the sheet on a horizontal plane) by the record head 5, which is capable of moving back and forth in a direction perpendicular to a surface of the sheet in FIG. 2, the sheet is forwarded for the predetermined amount in the secondary direction and stops. Then, recording for the next path is performed in the primary direction by the record head 5. When the recording is completed, the sheet is forwarded for the predetermined amount in the secondary direction again and stops. Then, recording for the further next path is performed in the primary direction by the record head 5. That is, the forwarding of the sheet in the secondary direction by the predetermined amount is sequentially repeated until the recording onto the sheet is completed.

FIG. 3 is an explanatory view showing a schematic constitution of the motor control device 10. As shown in FIG. 3, the motor control device 10 comprises the CPU 11 that controls the overall printer 100, the ASIC 12 that generates various control instructions for controlling the rotation velocity and rotation direction of the motor 7, and the driving circuit 13 that drives the motor 7 based on the various control instructions generated in the ASIC 12.

Figure 6:
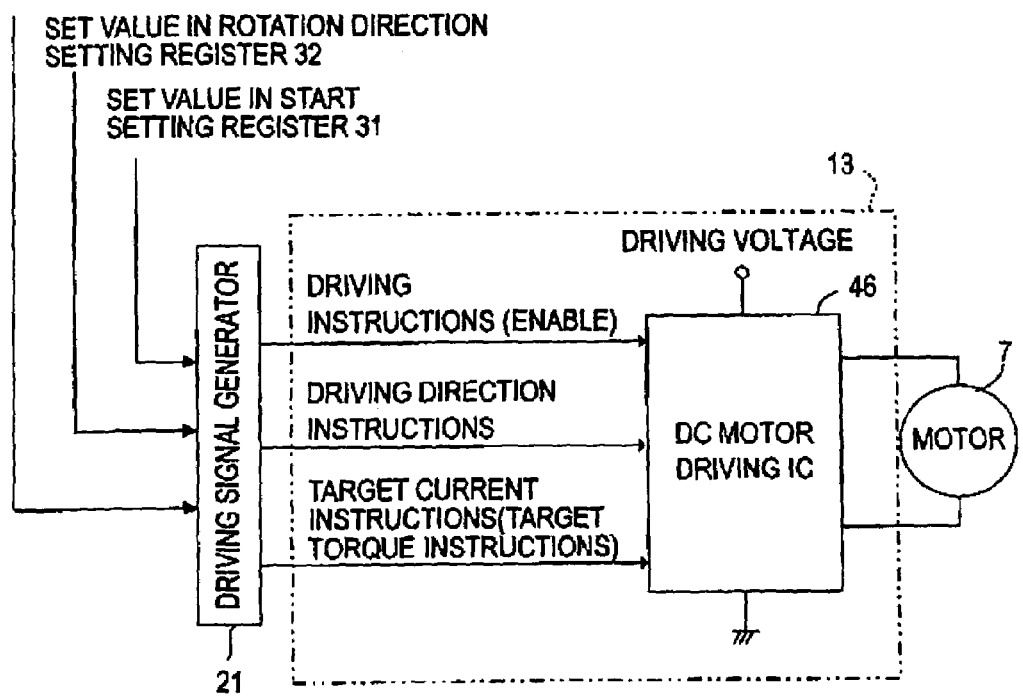
FIG. 6 is an explanatory view showing a schematic constitution of a driving circuit of the embodiments.

FIG. 6 shows the detail of the driving circuit 13. The driving circuit 13 starts operation in response to driving instructions generated in a driving signal generator 21 inside of the ASIC 12. The driving circuit 13 rotates the motor 7 in a driving direction indicated by driving direction instructions (i.e., a direction in which the motor 7 should be rotated) from the driving signal generator 21. The rotation amount of the motor 7 is controlled based on target current instructions (target torque instructions) from the driving signal generator 21. In other words, an H-bridge circuit is formed inside of a DC motor driving IC 46. Switching operation for respective switching elements constituting the H-bridge circuit is controlled based on the target current instructions from the driving signal generator 21.

The driving signal generator 21 generates and outputs the driving instructions based on a set value in a start setting register 31. The driving signal generator 21 further generates and outputs the driving direction instructions based on a set value in a rotation direction setting register 32. Moreover, the driving signal generator generates and outputs the target current instructions based on a manipulation amount u (i.e., target current value in the present embodiment) generated in a feedback calculator 20 inside of the ASIC 12.

The motor control device 10 controls the drive of the motor 7 (and controls the conveying roller 4) by way of a state feedback control using a state estimator in principle. What is largely different from a conventional state feedback control is that a plurality of levels are provided in an estimated fluctuation range of the load amount of the motor 7, and an appropriate state estimator is provided for each of the plurality of load levels so that one of the state estimators can be selected and used which corresponds to the load amount of the motor 7.

In the present embodiment, two levels are provided in the fluctuation range of the load amount of the motor 7, that is, "normal load level" and "high load level". A corresponding state estimator is provided for each level. The state estimator for normal load level (hereafter, also referred to as a "normal load observer") estimates an operating state of the conveying roller 4 or the motor 7 when the load of the motor 7 is in a predetermined design load value. The design load value is a load of the motor 7 when the motor 7 or the convoying roller 4 are in a normal state (that is, in the state of normal operating environment under the normal operating conditions). A state estimator for high load level (hereafter, also referred to as a "high load observer") estimates an operating state of the conveying roller 4 or the motor 7 when the load of the motor 7 is higher than the design load value.

The load of the motor 7 is likely to be in a range of normal load level in a normal use state. Therefore, the normal load observer is always selected by default. When there is a change in viscosity of grease in a shaft (not shown) of the conveying roller 4, or the belt 105 is hardened due to a fall of the ambient temperature or aging, the load amount of the motor 7 may be increased from the normal load level to the high load level. When the load amount is increased to the high load level, switching to the high load observer is performed.

Before the detailed constitution of the ASIC 12 is described, explanation on the feedback calculator 20 inside of the ASIC 12 is given. Then, explanation on how the motor 7 is controlled by a control signal (manipulation amount u) from the feedback calculator 20 is provided referring to FIGS. 7 to 10.

Figure 4:
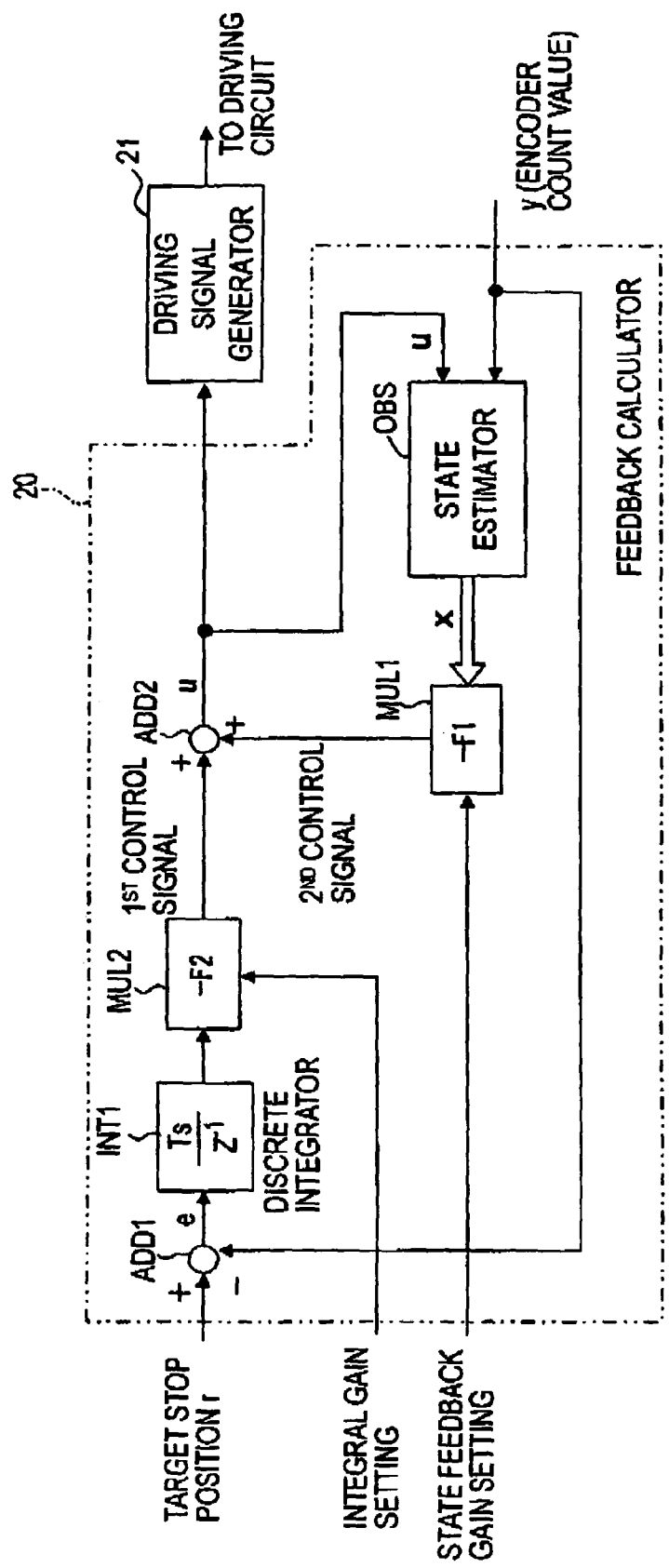
FIG. 4 is a block diagram showing a schematic constitution of a feedback calculator of the embodiments.

FIG. 4 is a block diagram showing a schematic constitution of the feedback calculator 20. As shown in FIG. 4, the feedback calculator 20 of the present embodiment performs a feedback control in such a manner that a count value y of the pulse signal of the encoder 8 obtained from a position counter 15 (see FIG. 3) coincides with a target stop position r set in a target stop position setting register 39 (see FIG. 3). The feedback calculator 20 comprises a state estimator OBS, a first adder ADD1, a discrete integrator INT1, an integral gain multiplier MUL2, a second adder ADD2, and a state feedback gain multiplier MUL1.

Firstly, a deviation between the target stop position r (i.e., target rotation amount of the conveying roller 4) set in the target stop position setting register 39 and the count value y obtained from the position counter 15 is calculated by the first adder ADD1. Then, the deviation calculated by the first adder ADD1 is discretely integrated by the discrete integrator INT1. That is, a cumulative of a value obtained by multiplying the deviation by sampling time Ts is calculated. Lastly, the cumulative calculated by the discrete integrator INT1 and an integral gain F2 set in the integral gain setting register 38 (see FIG. 3) are multiplied by the integral gain multiplier MUL2 so as to generate a first control signal.

A conveying system which conveys (sequentially forwards) a sheet by the motor 7 is considered as a position servo system which is modeled as a dynamic linear system and controls a forwarding amount of the sheet by receiving an input current to the motor 7 as a manipulation amount. In this case, the state estimator OBS performs calculation for implementing the state feedback control. What state variable to select is not uniquely specified as stated in the instruction manuals for the state feedback. Therefore, it is necessary to select the appropriate state variable according to the control system.

Figure 5:
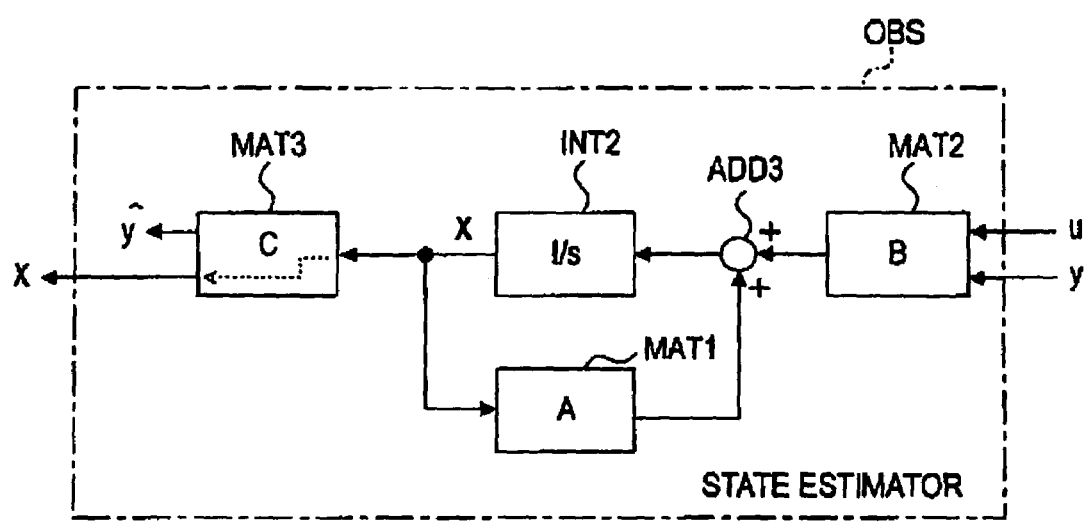
FIG. 5 is a is a block diagram showing a state estimator of the embodiments.

As shown in FIG. 5, the state estimator OBS of the present embodiment has a known basic constitution as a state estimator (observer). The state estimator OBS comprises an input matrix calculator MAT2, a third adder ADD3, an integrator INT2, a system matrix calculator MAT1, and an output matrix calculator MAT3.

In the above-constituted state estimator OBS, the manipulation amount u outputted from the feedback calculator 20 as the control signal, and the count value y obtained from the position counter 15, are calculated using an input matrix B. In the third adder ADD3, the result obtained in the input matrix calculator MAT2 and the result obtained in the system matrix calculator MAT1 are added together. The result of the addition is integrated by the integrator INT2. The result of this integration is an estimated state amount x of the motor 7 or the conveying roller 4. The estimated state amount x is multiplied by a system matrix A in the system matrix calculator MAT1. Simultaneously, the estimated state amount x is inputted to the output matrix calculator MAT3 so as to perform predetermined calculation with an output matrix C. As a result, an estimated value y^ of the count value y is obtained. The estimated value x is outputted also to the outside of the state estimator OBS as is.

In the present embodiment, there is the encoder 8 that can detect the rotation amount of the conveying roller 4. Therefore, parameters like the angle (rotation position) and angular velocity of the conveying roller 4, and further the angle (rotation position) and angular velocity of the motor 7 itself, by which dynamic behavior of the driving target (load) is characterized, is estimated as the state amount x, In the calculation of the state amount x, a state equation is produced using various parameters representing mechanical constants such as load resistance and inertia. Accordingly, the state estimator OBS calculates the state amount x based on the state equation. The calculation based on the state equation is implemented by a constitution shown in FIG. 5.

In this manner, the state estimator OBS estimates the state amount x representing the internal state of a mechanism for sheet conveyance based on the manipulation amount u indicated as the control signal inputted to the driving signal generator 21, and the count value y obtained from the position counter 15. The state amount x estimated by the state estimator OBS and a state feedback gain F1 set in the state feedback gain setting register 37 (see FIG. 3) are multiplied by the state feedback gain multiplier MUL1 so as to generate a second control signal.

Addition of the first control signal and the second control signal is performed by the second adder ADD2 so as to generate the control signal (manipulation amount u). In the present embodiment, the manipulation amount u is a target value of a current that is applied to the motor 7.

As above described, two state estimators (normal load observer and high load observer) are provided in the present embodiment. This means that two types of three matrices identifying the state equation in the state estimator OBS shown in FIG. 5, i.e., system matrix A, input matrix B, and output matrix C (hereafter, collectively referred to as "observer matrix obsv"), are set in the observer table setting register 36 (see FIG. 3). In other words, two types of the observer matrices obsv1, and obsv2 are set in the observer table setting register 36, and one of the observer matrices obsv1 and obsv2 is selected by the observer selector 19. The selected observer matrix is set to the respective matrices A, B, and C in the state estimator OBS. Particularly, when the observer matrix obsv1 is selected, the state estimator OBS is configured as the normal load observer. When the observer matrix obsv2 is selected, the state estimator OBS is configured as the high load observer.

Figure 7A:
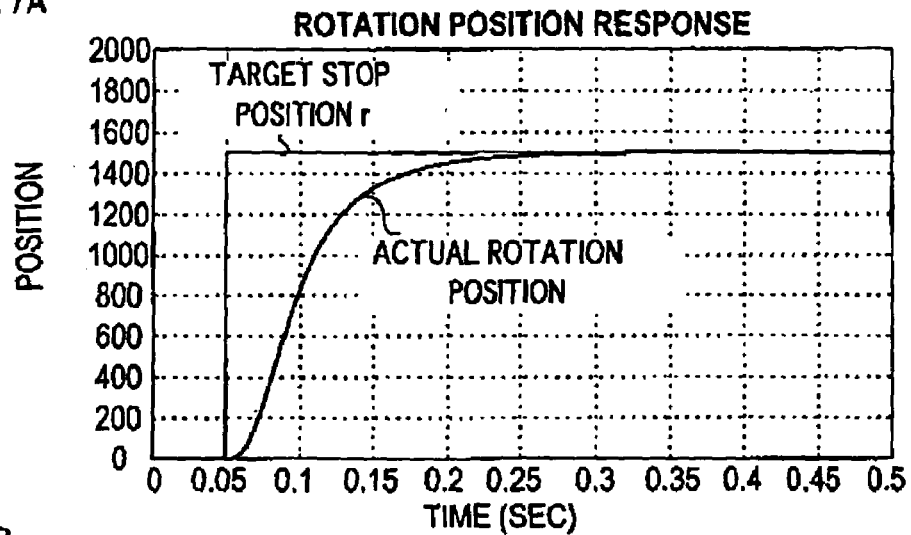
FIGS. 7A, 7B, and 7C are graphs showing various control responses in a case that a load amount of a motor is in a normal load level in the first embodiment.
Figure 7B:
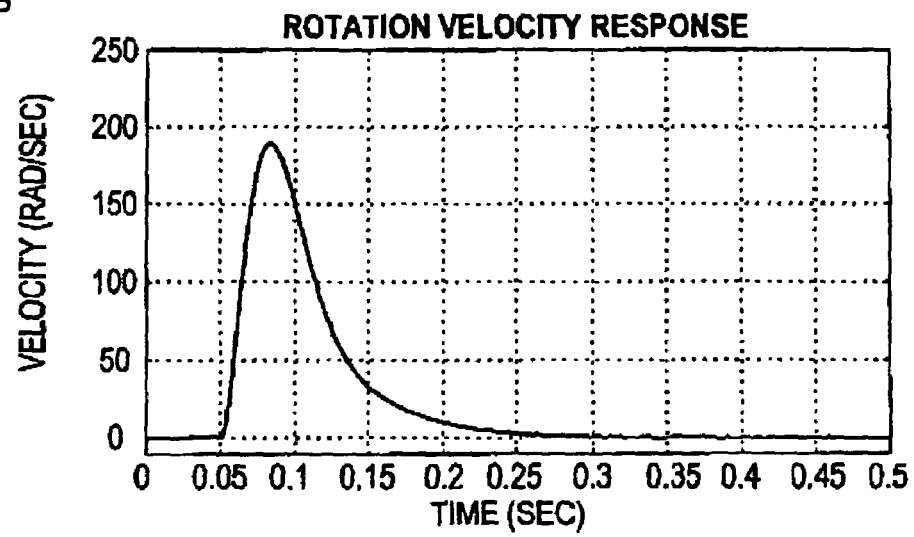
Figure 7C:
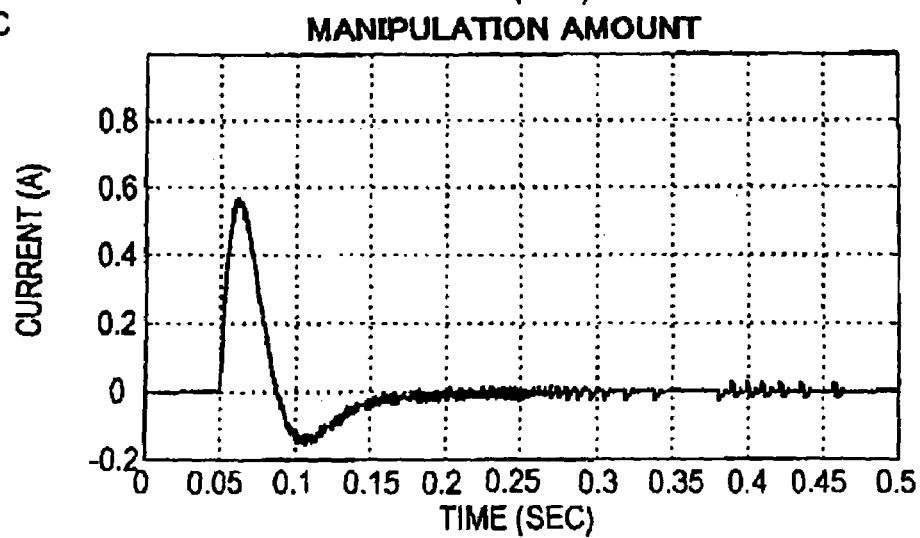

Hereafter, explanation is given on various control responses made when the motor 7 is actually driven to operate the conveying roller 4 by the above configured feedback calculator 20. FIGS. 7A, 7B, and 7C show responses in the case of normal, that is, when the conveying roller 4 is in a normal state, the load amount of the motor 7 is in a range of the normal load level, and the normal load observer is selected as the state estimator OBS (that is, by default).

In the case of the normal load level, the manipulation amount u (i.e, target current value), as shown in FIG. 7C, is increased to a plus side once immediately after the motor 7 is rotationally driven. Then, the manipulation amount u is decreased to a minus side, and finally converges on an extremely small value around "0". Since the manipulation amount u fluctuates as above, the rotation position of the conveying roller 4 (specifically, the count value y obtained from the position counter 15), as shown in FIG. 7A, is gradually increased, and reaches to the target stop position r at around 0.35 sec. Also, the rotation velocity of the conveying roller 4, as shown in FIG. 7B, is increased once immediately after the start of the rotational drive. Then, the rotation velocity is again decreased and gradually converges on "0".

If the load amount of the motor 7 does not fluctuate and the normal load level is always maintained, the response characteristics as shown in FIGS. 7A to 7C are obtained so as to produce the steady control at all times. However, as the load amount of the motor 7 fluctuates due to change in the ambient temperature or aging, the control response characteristics may deviate from the characteristics shown in FIGS. 7A to 7C.

FIGS. 8A, 8B, and 8C show various control responses in the case that the load amount of the motor 7 fluctuates (is increased). FIGS. 8A to 8C respectively show responses in the cases that the load amount is increased 4 times (×4), 8 times (×8), and 12 times (×12) larger than the normal load amount, under the condition that the same state estimator OBS (normal load observer) is selected. A peak value of the manipulation amount u, that is, the largest control current is increased as the load amount is increased as shown in FIG. 8C. Moreover, while the load amount normally converges on "0" at around 0.2 sec., the larger the load amount is, the load amount moves to a minus side once at around 0.2 sec.

As shown in FIG. 8A, in the case that the load amount is large (specifically, in the case of ×12), the rotational position of the conveying roller 4 go over the target stop position subtly and then returns to the predetermined target stop position. So-called an overshoot has occurred. The same applies to the rotation velocity. As shown in FIG. 8B, in the case of the load amount is large (in the case of ×12), the load amount is shifted to a minus side at around 0.2 sec.

In other words, under the condition that the normal load observer is selected to perform the state feedback control, if the load amount of the motor 7 is increased from the normal load amount (a predetermined value in a range of the normal load level), the peak value of the manipulation amount u is increased and an overshoot occurs. The overshoot does not appear to be a problem since the load amount returns to the predetermined target stop position in FIG. 8A. However, this only shows that the rotational position of the encoder 8 is returned to a regular position. It does not mean that the sheet forwarded past the predetermined stop position is returned to the proper position. Accordingly, quality of an image recorded on the sheet deteriorates. Therefore, the overshoot should not be permitted in practice.

In the present embodiment, when the load amount of the motor 7 is increased to the high load level, the state estimator OBS is switched to the high load observer. Since an increase of the load amount corresponds to an increase of the peak value of the manipulation amount u, it is determined whether the manipulation amount u exceeds the predetermined manipulation threshold (specifically, whether the period in which the manipulation amount u exceeds the manipulation threshold is equal to or over the predetermined switching determination time). If the period is equal to or over the switching determination time, the normal load observer is switched to the high load observer.

Figure 9:
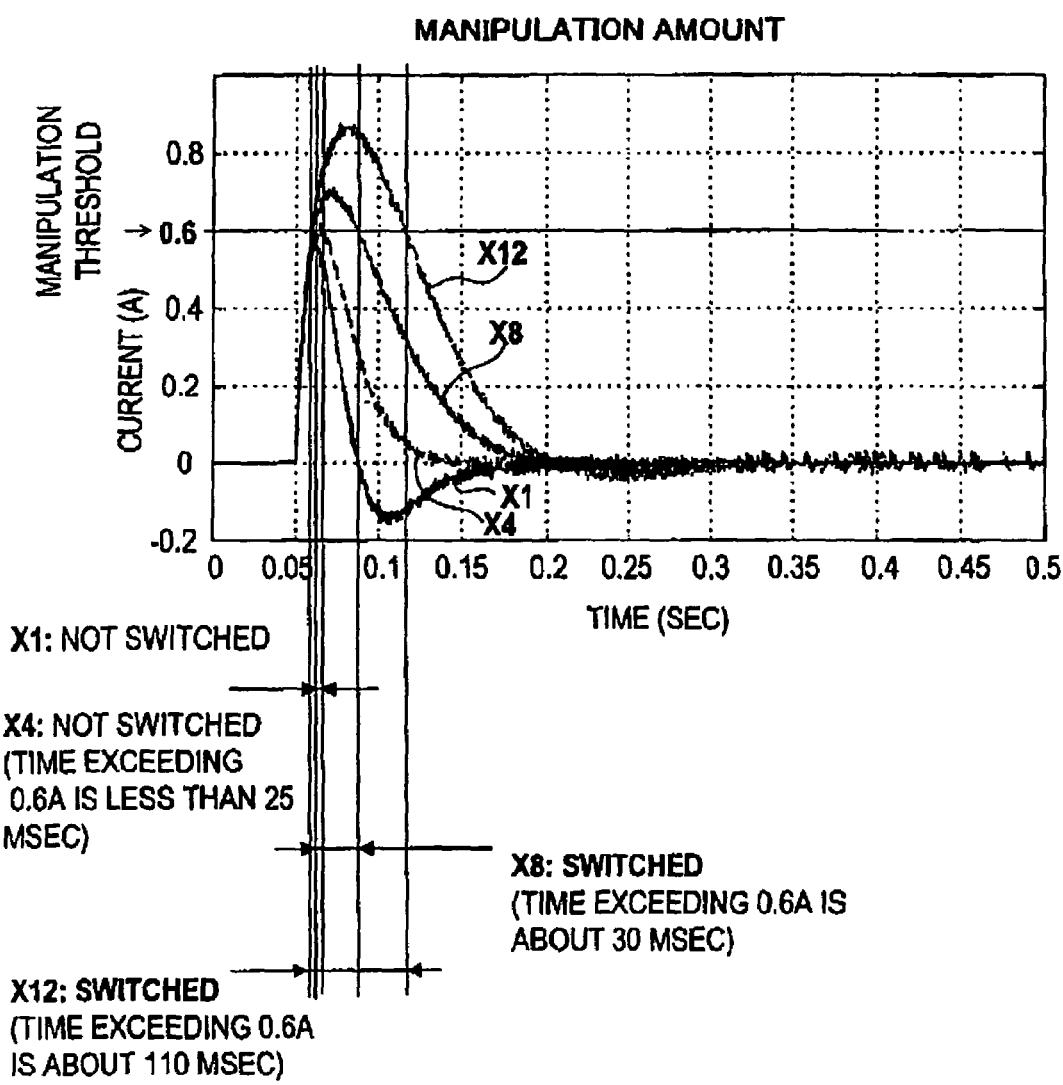
FIG. 9 is a graph explaining a determination manner for switching an observer in the first embodiment.

Particularly in the present embodiment, the manipulation threshold is set to 0.6 [A] as shown in FIG. 9. The switching determination time is set to 25 msec. When a period in which the manipulation amount u exceeds the manipulation threshold is equal to or over the switching determination time 25 msec., switching to the high load observer is performed. A period of about 0.3 sec. from the start of the motor 7 (0.05 sec.) until the stop of the motor 7 (approximately 0.35 sec.) is a conveying roller rotation period per one forwarding operation in a secondary scanning direction in the conveying section. It is determined whether the manipulation u exceeds the operation amount threshold for no less than the predetermined period (25 msec.) during the conveying roller rotation period.

In other words, if the manipulation amount u exceeds the manipulation threshold for 25 msec. or above, it is determined that the load amount of the motor 7 is in a range of the high load level, and switching to the high load observer is performed. After the switching to the high load observer, and when the period in which the manipulation amount exceeds the manipulation threshold does not reach 25 msec. due to a decrease in the load amount, it is determined that the load amount has returned to the normal load level, and switching to the normal load observer is performed.

In the present embodiment, even if it is determined that the load amount is in a range of the high load level in one forwarding operation, switching to the high load observer is not performed. The number of times it is determined that the load amount is in a range of the high load level is counted per one forwarding operation which is repeatedly performed during the sheet conveyance in the conveying section. When the number of times exceeds a predetermined repeated number, switching to the high load observer is performed.

The same applies to the switching from the high load observer to the normal load observer. After the switching to the high load observer, the number of times it is determined that the load amount is in the normal load level reaches the predetermined repeated number, that is, a repeating counter 28 shows "0", switching to the normal load observer is performed.

In FIG. 9, when an increase in the load amount is relatively gentle (in case of normal load amount and ×4), the period in which the manipulation amount exceeds the manipulation threshold is less than 25 msec., and switching to the high load observer is not performed. When the load amount is 8 times or 12 times larger than the normal load amount, the period in which the manipulation amount exceeds the manipulation threshold is 25 msec. or above, and switching to the high load observer is performed.

FIGS. 10A, 10B, and 10C show control responses in the case that the switching of the normal load observer is not performed when the load amount is normal and 4 times larger than the normal load amount and that the switching to the high load observer is performed when the load amount is 8 times and 12 times larger than the normal load amount. As shown in FIG. 10C, as the load is increased, the peak value of the manipulation amount u (maximum control current) is increased. However, the shifting to a minus side after 0.2 sec. is almost cleared. Thereby, as shown in FIG. 10A, an overshoot in the rotation position response does not occur. Also, as shown in FIG. 10B, fluctuations of the maximum velocity in the rotation velocity response are reduced. Even if the observer is switched to the high load observer, the peak value of the manipulation amount u is still increased according to the load amount. Therefore, even after the switching to the high load observer, whether the load amount is in a range of the high load level or is returned to the normal level can be determined based on the same manipulation threshold.

Returning to FIG. 3, explanation is given on the ASIC 12 of the present embodiment. The ASIC 12 comprises mode setting registers 30 which store various parameters used in controlling the motor 7. The mode setting registers 30 include the start setting register 31 that is used to start the motor 7, a rotation direction setting register 32 that is used to set a rotation direction of the motor 7, a manipulation threshold setting register 33 that is used to set the aforementioned manipulation threshold which is the standard of determination on the load level, a switching time setting register 34 that is used to set the switching determination time (25 msec. in the present embodiment), a repeated time setting register 35 that is used to set the aforementioned repeated number, an observer table setting register 36 that is used to set the normal load observer (i.e., observer matrix obsv1) and the high load observer (i.e., observer matrix obsv2), a state feedback gain setting register 37 that is used to set the state feedback gain F1, an integral gain setting register 38 that is used to set the integral gain F2, a target stop position setting register 39 that is used to set the target stop position r, a calculation timing setting register that is used to set the sampling time To in the discrete integrator INT1, and a control output upper setting register 41 that is used to set the upper limit of the manipulation amount u.

An encoder edge detector 14 takes in the pulse signal from the encoder 8 to detect an edge of the pulse signal (for example, one of the leading edge and the trailing edge, or both). The detected edge is counted by the position counter 15. The rotation amount (position of the sheet conveyed in the conveying section) of the conveying roller 4 is detected as the count value y. A cycle counter 16 measures the time between the edges detected by the encoder edge detector 14 (a cycle) so as to detect the rotation velocity of the conveying roller 4.

A clock generator 22 generates a clock signal having a cycle sufficiently shorter than the cycle of the pulse signal. The clock generator 22 supplies the clock signal to each part of the ASIC 12. A signal processor 17 performs error handling and outputs an interrupt signal to the CPU 11.

A table switching determiner 18 compares the control signal (manipulation amount, u) from the feedback calculator 20 and the manipulation threshold so as to determine the load level of the load amount of the motor 7. The table switching determiner 18 gives the observer selector 19 instructions to switch the state estimator OBS. Particularly, every time the sheet is forwarded, that is, during one forwarding period, the timing counter 27 counts the period in which the manipulation amount u exceeds the manipulation threshold. The switching determination time set in the switching time setting register 34 is set to a timing width register 26. When the period timed by the timing counter 27 reaches the switching determination time or above, the repeating counter 28 is incremented. The count value of the repeating counter 28 reaches to the repeated number or above set in the repeated time setting register 35, it is determined that the load amount has reached the high load level. Instructions to select the high load observer are given to the observer selector 19.

In response to the instructions, the observer selector 19 sets the observer matrix obsv2 for the high load observer to the respective matrices A, B, and C in the state estimator OBS in the feedback calculator 20.

On the other hand, if the load amount is in a range of the normal load level, the period timed by the timing counter 27 is less than the switching determination time. The repeating counter 28 is decremented. Accordingly, the load amount is increased to be in a range of the high load level. The count value of the repeating counter 28 becomes equal to or more than the predetermined repeated number so that the switching to the high load observer 27 is performed. When the load is decreased to be in the normal load level, the period timed by the timing counter 27 is less than the switching determination time. The count value of the repeating counter 28 is decremented one by one per one forwarding operation. When the count value becomes "0", it is determined that the load amount is in the normal load level so that instructions to select the normal load observer are given to the observer selector 19.

In response to the instructions, the observer selector 19 sets the observer matrix obsv1 to the respective matrices A, B, and C in the state estimator OBS in the feedback calculator 20.

Figure 11:
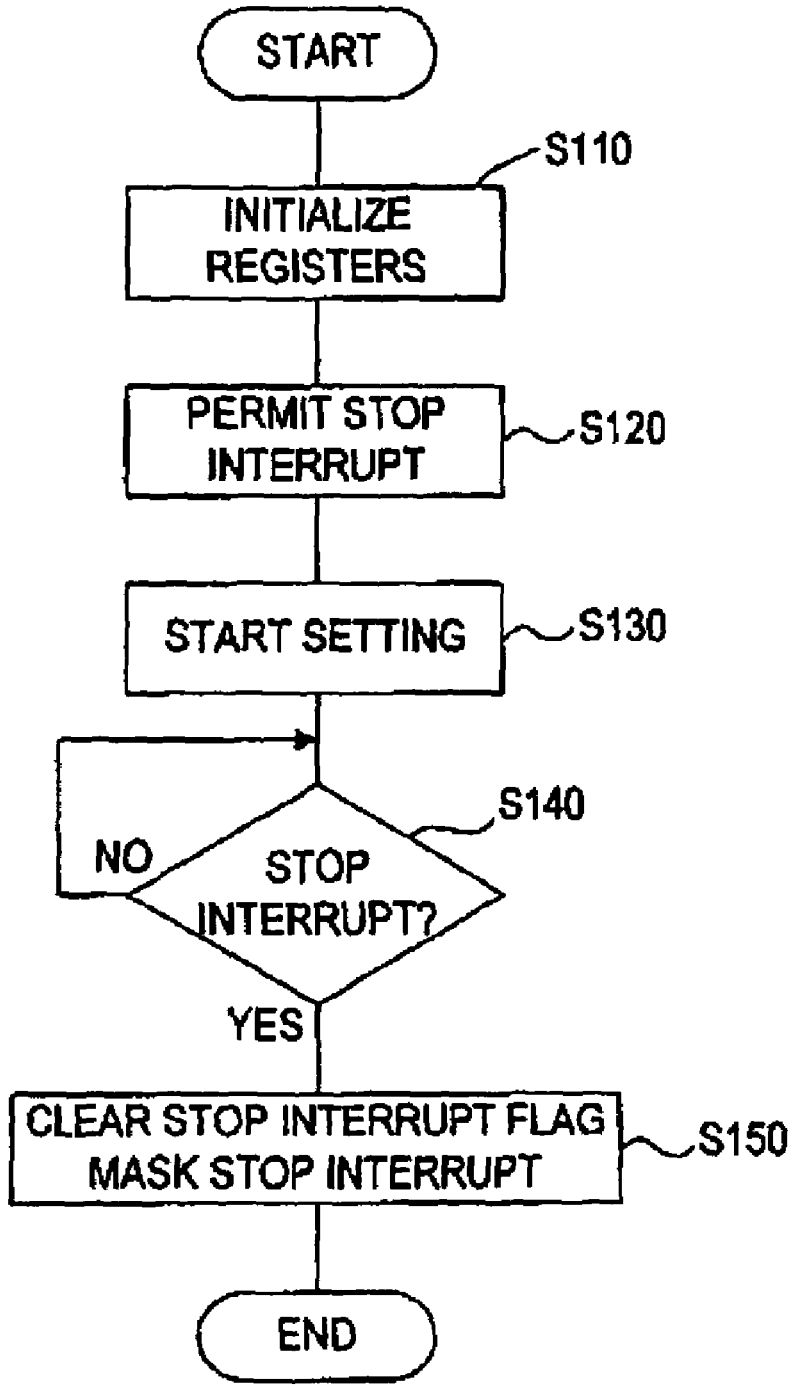
FIG. 11 is a flowchart showing an ASIC setting process performed by a CPU of the first embodiment.
Figure 12:
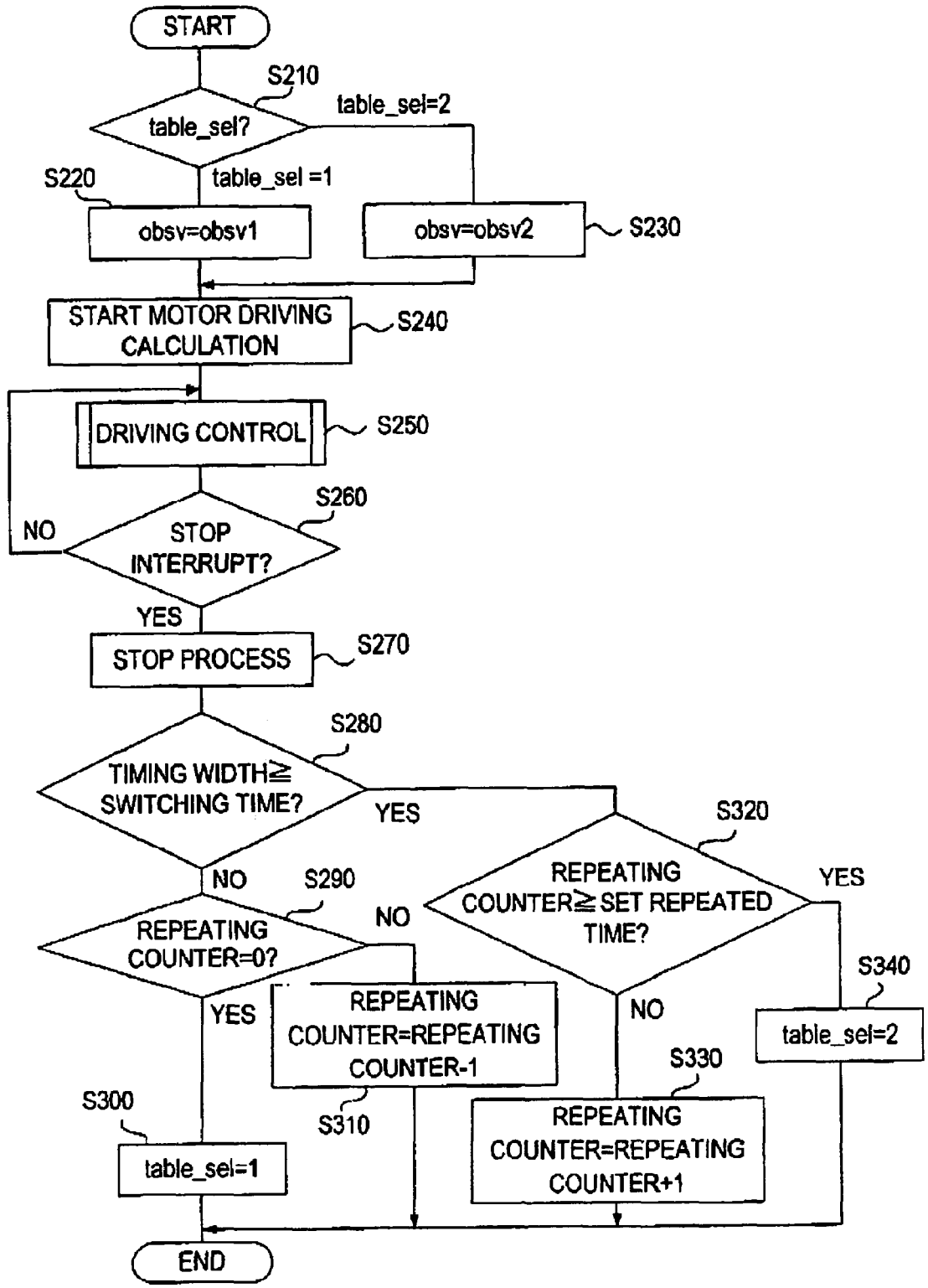
FIG. 12 is a flowchart showing a motor control process performed by an ASIC of the first embodiment.
Figure 13:
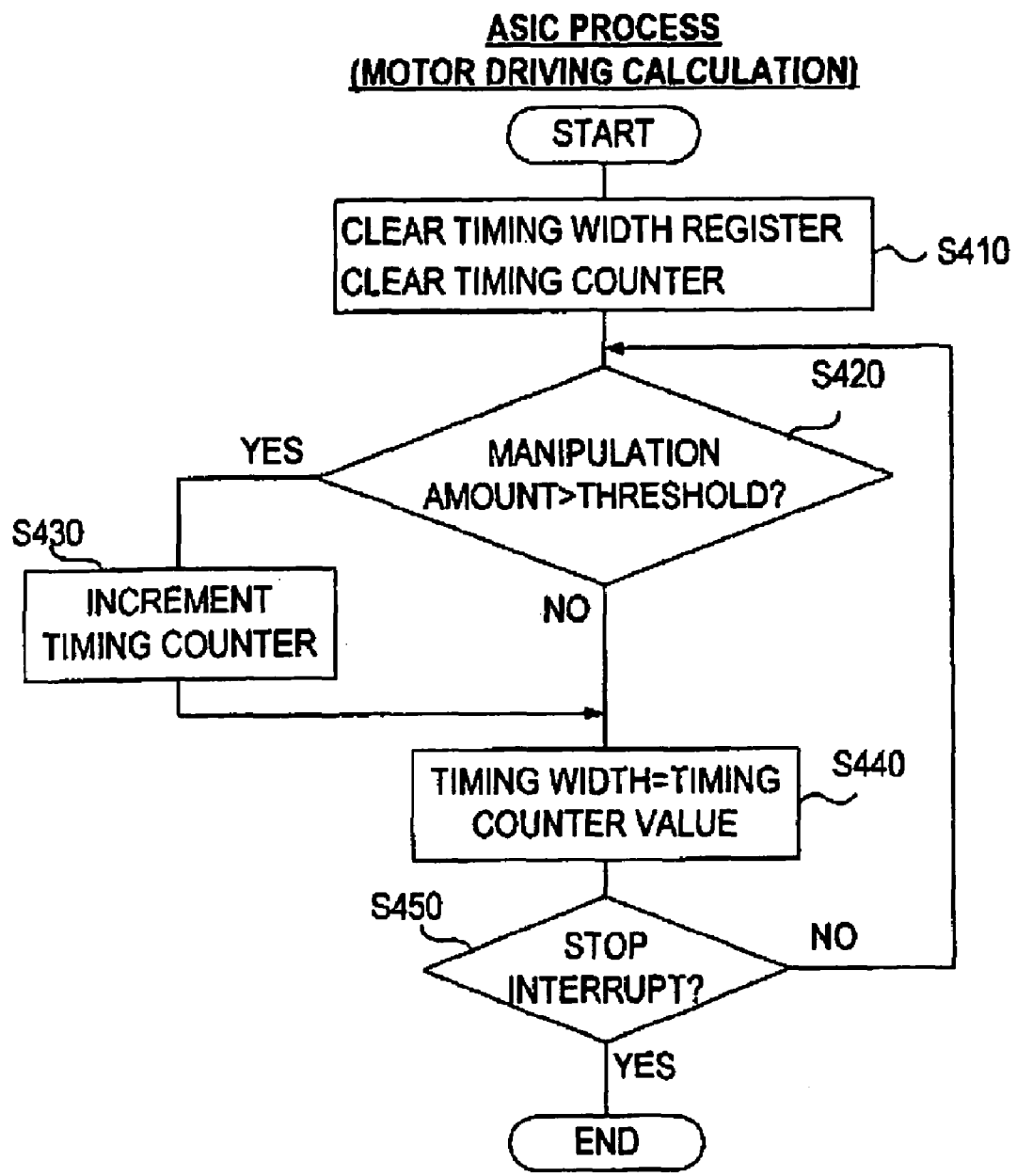
FIG. 13 is a flowchart showing a motor driving calculation process in S240 of the motor control process of FIG. 12.

Referring to FIGS. 11 to 13, explanation is given on a process performed by the CPU 11 and a process performed by the ASIC 12, in the motor control device 10 of the present embodiment. FIG. 11 is a flowchart showing an ASIC setting process performed by the CPU 11.

When the sheet is conveyed by the conveying roller 4, the ASIC setting process is firstly started. In S110, the respective registers of the mode setting registers 30 are initialized. In S120, stop interrupt permission is outputted to the ASIC 12. The ASIC 12 is now able to output a stop interrupt signal every time the sheet is stopped at the predetermined target stop position r during the forwarding operation.

In S130, the start setting register 31 is set so that the conveyance (forwarding) of the sheet is started by the drive of the motor 7 and the rotational drive of the conveying roller 4. The motor 7 is hereafter controlled basically by the ASIC 12. The CPU 11 stands by for the stop interrupt signal in S140. When the stop interrupt signal is outputted from the ASIC 12, it is positively determined in S140 and the process moves to S150, A stop interrupt flag is cleared in S150, and an interrupt mask process is performed so that no more interrupt signal comes in. The ASIC setting process shown in FIG. 11 is performed every time the sheet is forwarded in a secondary scanning direction in the conveying section.

A motor control process performed in the ASIC 12 is explained by way of FIG. 12. The motor control by the ASIC 12 is a hardware operation as is generally known. The hardware operation is explained by way of a flowchart in order to facilitate understanding.

The start setting register 31 is set by the process of the CPU 11. Thereby, the ASIC 12 starts the control process. In S210, a set value in table_sel is determined. The table_sel shows which of the normal load observer (table_sel=1) or the high load observer (table_sel=2) is selected as the state estimator OBS. In the present embodiment, the normal load observer is selected by default. Accordingly, since table_sel=1, the process moves to S220.

In S220, the normal load observer matrix obsv1 is set to the observer matrix obsv. Thereby, the state estimator OBS becomes the normal load observer. In S240, motor driving calculation is started. In S250, the drive control of the motor 7 is started. The drive control in S250 is a state feedback control that is performed until the rotation amount of the conveying roller 4 reaches the target stop position r and stops. Accordingly, it is negatively determined in S260 until the rotation amount reaches to the target stop position r, that is, until the stop interrupt signal is outputted. When the conveying roller 4 is rotated to the target stop position r and stops, the process moves to S270 to perform a termination process.

Details of the motor driving calculation started in S410 are as shown in FIG. 13. Firstly, in S410, the timing width register 26 and the timing counter 27 are cleared. In S420, it is determined whether the manipulation amount u exceeds the manipulation threshold. If positively determined in S420, the timing counter 27 is incremented in S430 and the process moves to S440. In S440, the count value in the timing counter 27 is set to the timing width register 26. In S450, it is determined whether the stop interrupt has occurred. If positively determined, the motor driving calculation process is ended. Otherwise, steps of S420 and afterwards, that is, determination on whether the manipulation amount u exceeds the manipulation threshold, is repeated.

When the conveying roller 4 stops, after the completion of one forwarding operation, steps of S280 and afterwards are performed before the next forwarding operation is started. That is, it is determined whether the count value in the timing counter 27 set in the timing width register 26, i.e., the period in which the manipulation amount u exceeds the manipulation threshold, is equal to or more than the switching determination time set in the switching time setting register 34. If it is positively determined, the process moves to S320 and it is determined whether the count value in the repeating counter 28 is equal to or more than the repeated number set in the repeated time setting register 35.

If it is negatively determined in S280, the repeating counter 28 is incremented in S330 and the process is ended. If it is positively determined, it is determined that the load amount of the motor 7 is increased to be in a range of the high load level. In S340, "2" is set to table_sel. Thereby, the high load observer is used in the next forwarding operation.

If negatively determined in S280, it is determined whether the count value in the repeating counter 28 is "0" in S290. If the count value is not "0", the count value of the repeating counter 28 is decremented in S310. If the count value is "0", "1" is set to table_sel in S300. In other words, the state estimator OBS is switched to the normal load observer by selecting the normal load observer matrix obsv1 and applying the same to the state estimator OBS.

As above, after one forwarding operation is completed and the switching of the state estimator OBS is performed based on the count value in the timing counter 27 (or status quo is maintained), the processes shown in FIGS. 11 to 13 are started in the same manner and the next forwarding operation is started again. At this time, if table_sel=2 after the completion of the previous forwarding operation, the process moves to S230 in S210 at the time of the next forwarding operation, and the high load observer matrix obsv2 is set to the observer matrix obsv. Thereby, the state estimator OBS is switched to the high load observer.

[Second Embodiment]

In the first embodiment, an appropriate observer is selected according to the fluctuations in the load amount of the motor 7. Thereby, high control performance is maintained in the state feedback control using the state estimator OBS. However, under the conditions that merely the observer is switched according to the load level, the manipulation amount u is increased as the load amount is increased, as can be clearly seen in FIG. 10C.

An increase in the manipulation amount u may lead to an increase in power consumption of the whole apparatus, and further to an increase of a capacity of the power source. Or, deterioration in stopping accuracy may occur. Depending on the type of the control system, it may not be desirable that the manipulation amount u is increased so much.

In the present embodiment, not only the observer but also the control gain is switched according to the load level so that too much increase is inhibited in the manipulation amount u even if the load amount is increased.

Particularly, appropriate control gains are set for each of the two load levels, that is, "normal load level" and "high load level". The control gains herein correspond to the state feedback gain F1 and the integral gain F2 used in the feedback calculator 20 (see FIG. 4). These two control gains are respectively set for each of the load levels so as not to produce a large difference between the manipulation amount u when the normal load observer is selected and the manipulation amount u when the high load observer is selected.

Figure 14A:
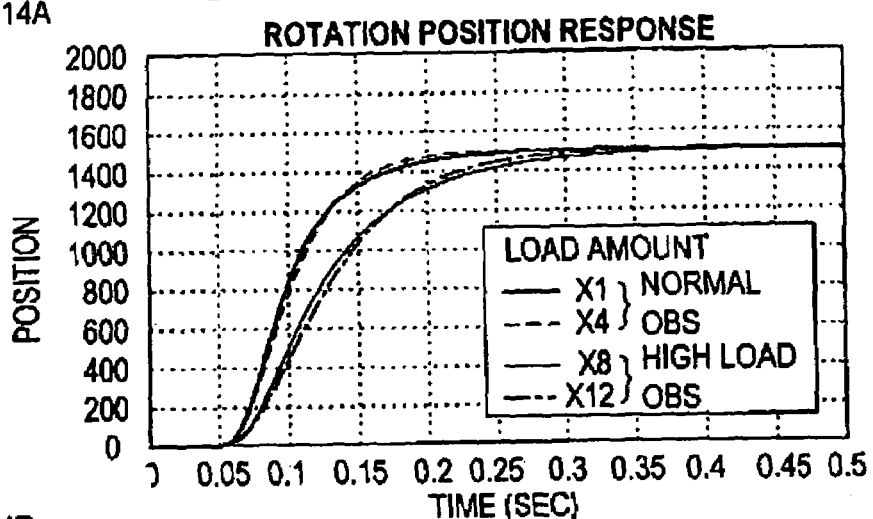
FIGS. 14A, 14B, and 14C are graphs showing changes in various control responses in a case that an observer and a control gain are switched due to an increase in the load amount in a second embodiment.
Figure 14B:
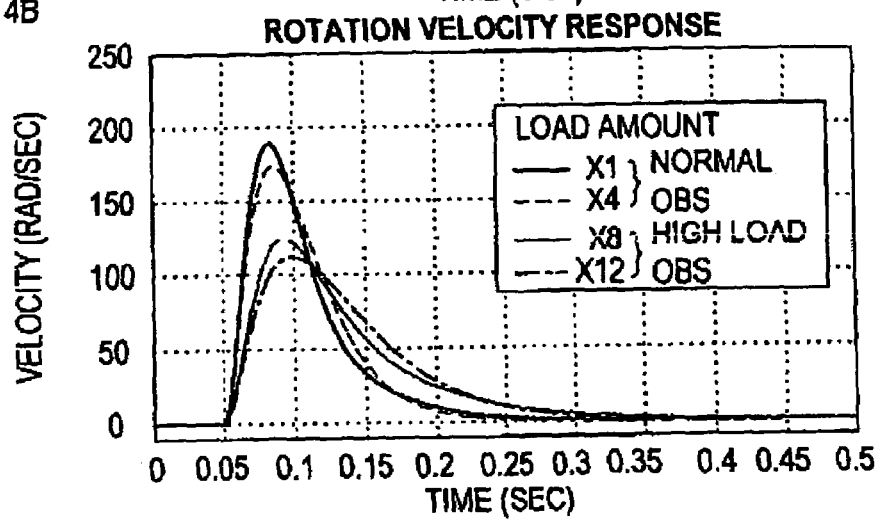
Figure 14C:
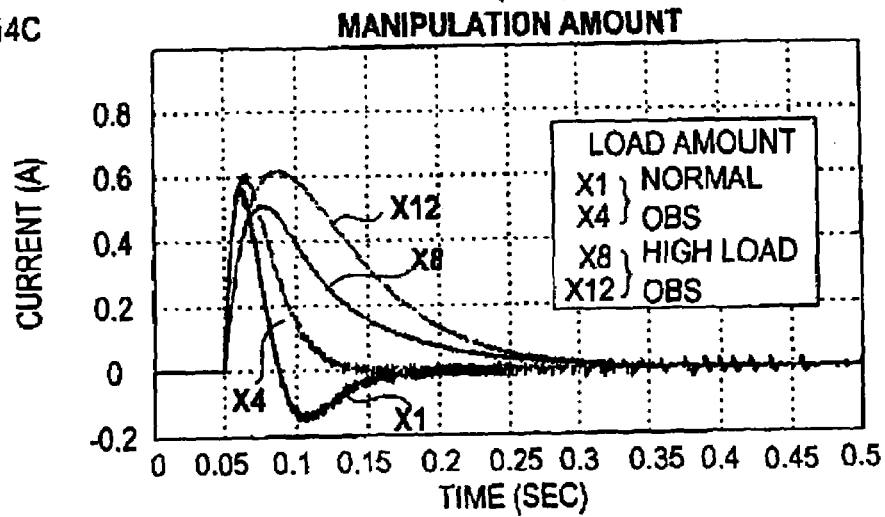

FIGS. 14A, 14B, and 14C are graphs showing changes in the various control responses when the observer and the control gains are switched to those for the high load level due to an increase in the load amount. When the load amount is normal (×1) or 4 times larger (×4) than the normal load amount, the normal observer is selected and the control gains corresponding to the normal load observer are selected. When the load amount is 8 times larger (×8) or 12 times larger (×12) than the normal load amount, the high load observer is selected and the control gains corresponding to the high load observer are selected.

It is clear by comparison between FIGS. 14C and 10C that switching of not only the observer but the control gains inhibits a rise in the peak value of the manipulation amount u. Even if the load amount becomes larger, it is possible to control the maximum current value to be in a normal state. However, if the control gains are switched so as to control the peak value of the manipulation amount u, the rotation velocity becomes slower, as shown in FIGS. 14A and 14B, while the high load observer is selected. The time period required to reach the target stop position also gets longer.

Merely adapting the motor control device 10 of the first embodiment to switch the control gains as well as the observer creates one problem. In case of switching the observer to the high load observer, for example, it is not possible to perform determination on the load level using the manipulation threshold before the switching (0.6 [A] in the present embodiment) because the peak value of the manipulation amount u is held in the same level as the peak value of the manipulation amount u in the normal load level. Assuming that the same manipulation threshold is used, the peak value of the manipulation amount u when the observer is switched to the high load level is controlled to be around 0.6 [A] as shown in FIG. 14C. Therefore, even if the load amount is still in the high load level, the observer is promptly switched to the normal load observer again.

Figure 15A:
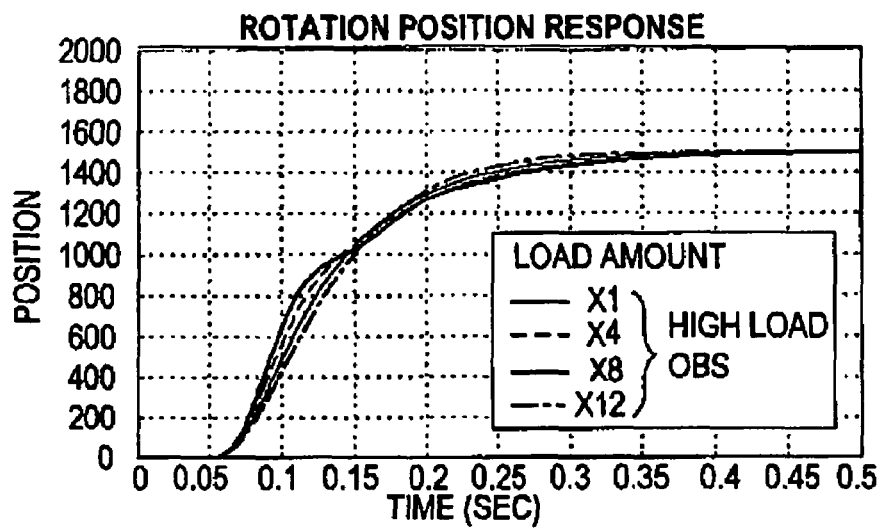
FIGS. 15A, 15B, and 15C are graphs showing changes in various control responses in a case that the load amount is decreased after the observer and the control gain are switched due to an increase in the load amount in the second embodiment.
Figure 15B:
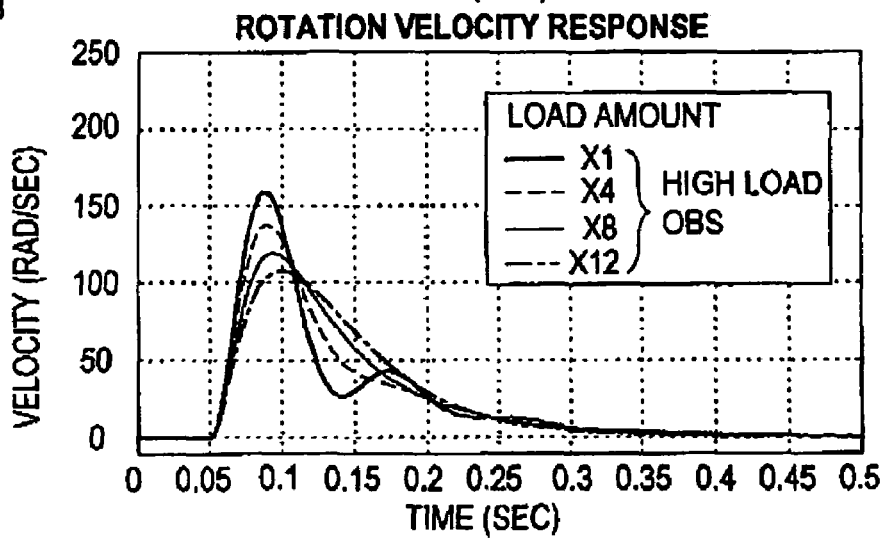
Figure 15C:
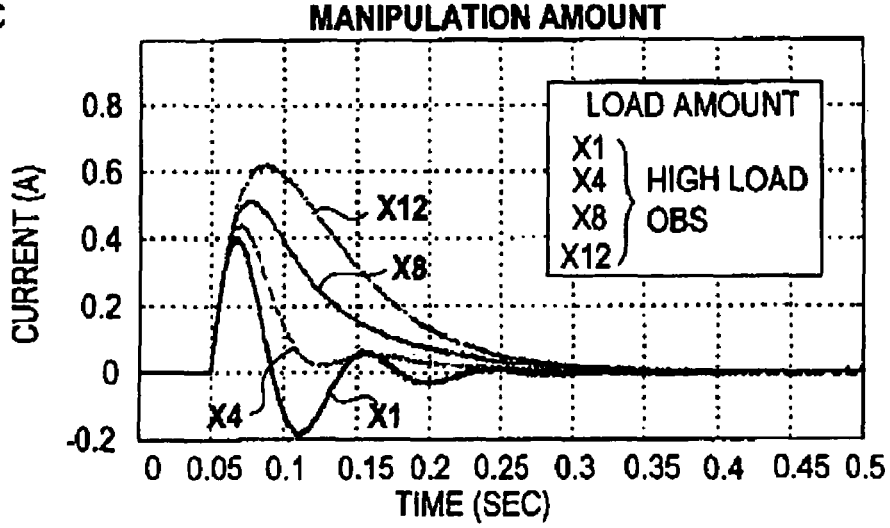

On the other hand, if the load amount is decreased after the observer and the control gains are switched to those for the high load level, the peak value of the manipulation amount u is also decreased as shown in FIG. 15C. FIGS. 15A, 15B, and 15C show responses in the case of the observer and the control gains corresponding to the high load level.

Figure 16:
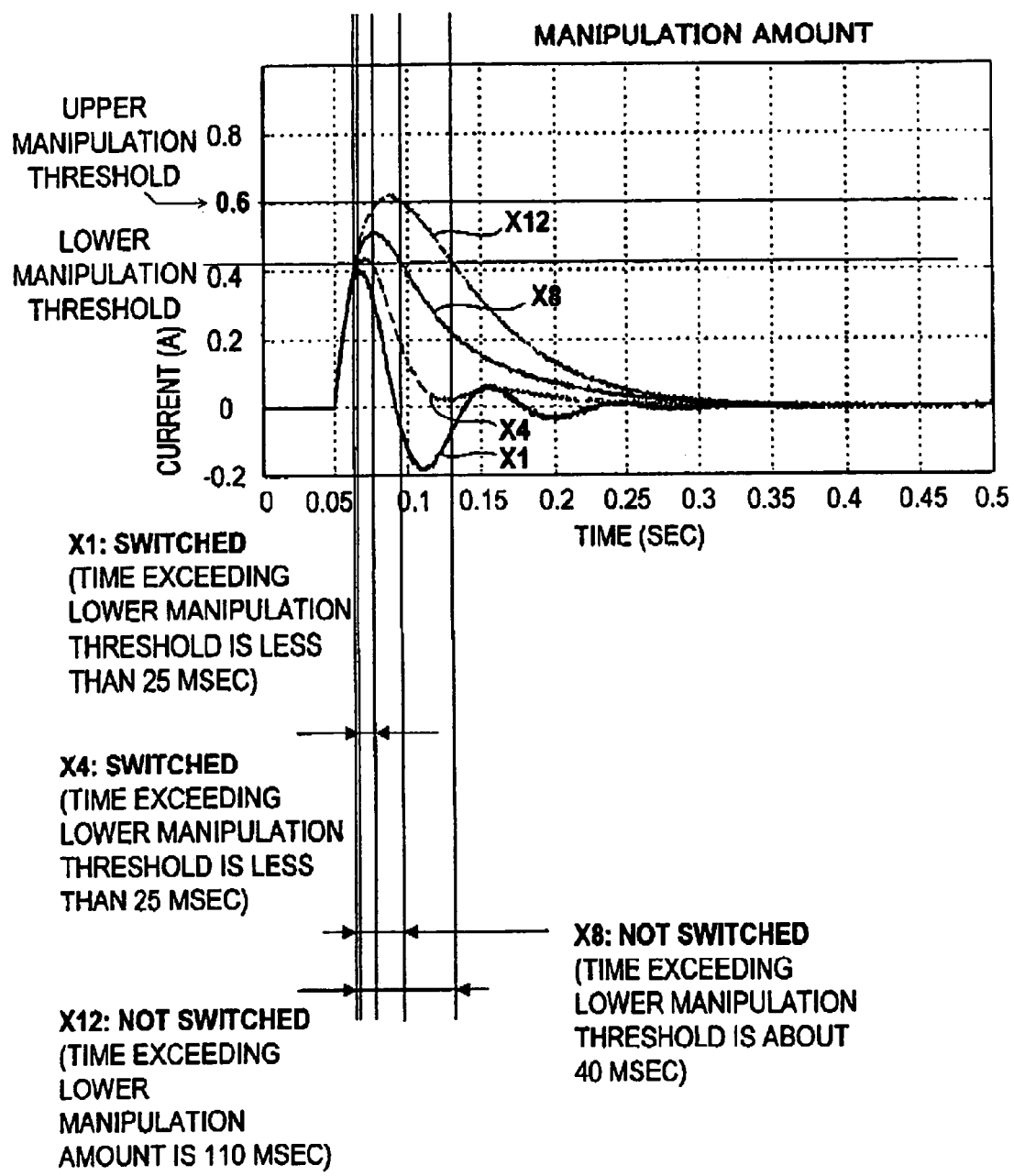
FIG. 16 is a graph explaining a determination manner for switching the observer and the control gain in the second embodiment.

Accordingly, in the present embodiment, determination on whether the load amount is lowered to the normal load level after the observer and the control gains are switched to those for the high load level is performed based on a threshold lower, than the manipulation threshold. Particularly, as shown in FIG. 16, determination on whether the load amount is increased from the normal load level to the high load level when the normal load observer and the corresponding control gains are selected is based on an upper manipulation threshold (the same as the manipulation threshold in the first embodiment). Contrary, determination on whether the load amount is decreased from the high load level to the normal load level when the high load observer and the corresponding control gains are selected is based on a lower manipulation threshold. The determination based on the lower manipulation threshold can be performed, for example, by determining that the load amount is still in the high load level when the period in which the manipulation amount u exceeds the lower manipulation threshold is equal to or more than the predetermined switching determination time (25 msec. in the present embodiment). When the period in which the manipulation amount u exceeds the lower manipulation threshold is less than the predetermined switching determination time, it is determined that the load amount is decreased to the normal load level.

In this manner, as shown in FIG. 16, when the load amount is still large (×12 and ×8), the observer is not switched because the period in which the manipulation amount u exceeds the lower manipulation threshold is equal to or more than 25 msec. However, when the load amount becomes smaller (×1 and ×4), the observer is switchable to the normal load observer because the period in which the manipulation amount u exceeds the lower manipulation threshold is less than 25 msec.

Figure 17:
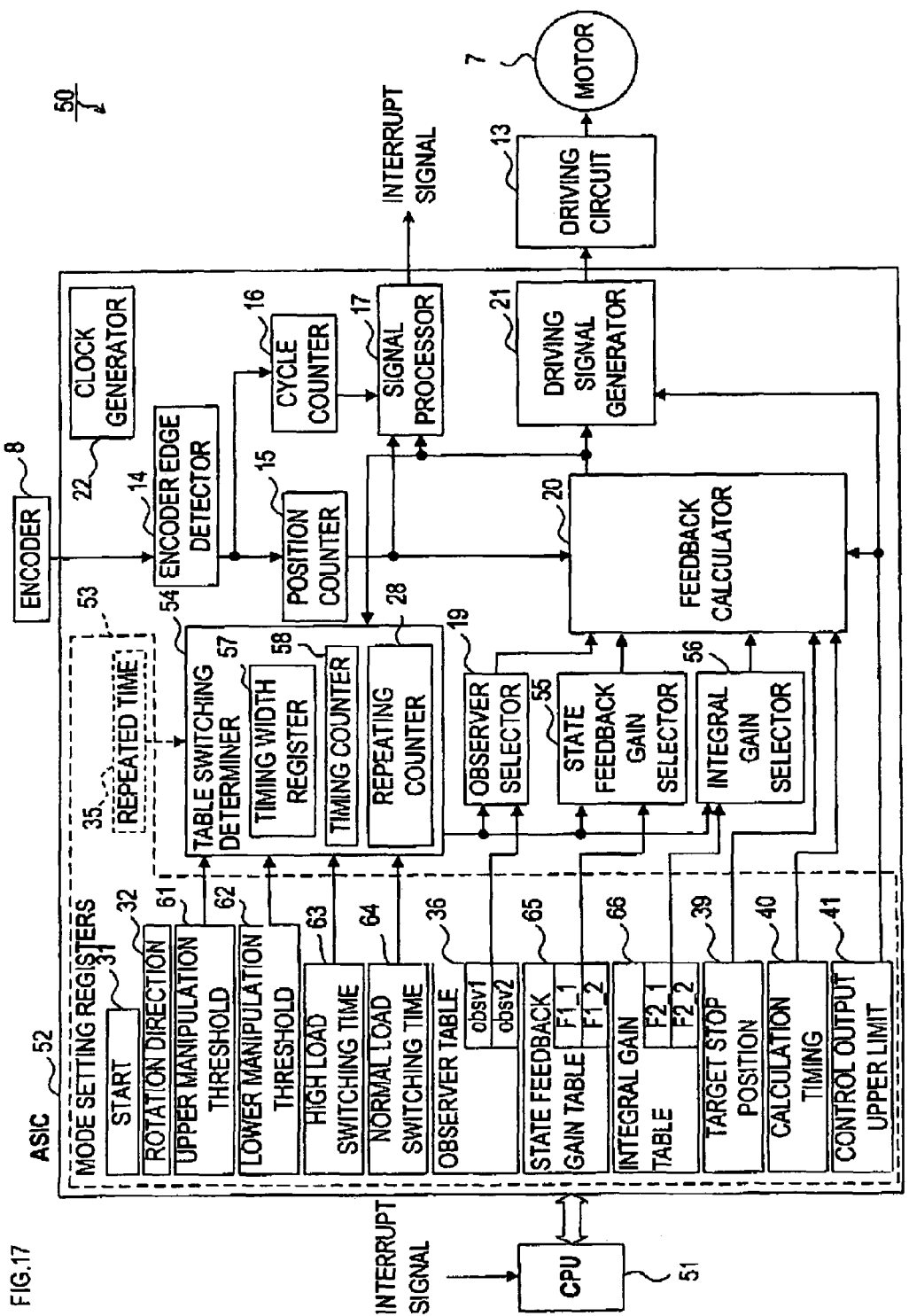
FIG. 17 is a block diagram showing a schematic constitution of a motor control device of the second embodiment.

The above explained switching of the observer and the control gains according to the load level can be achieved in a motor control device 50 configured as shown in FIG. 17. The difference between the motor control device 50 in the present embodiment and the motor control device 10 in the first embodiment (FIG. 3) is as follows.

The motor control device 50 of the present embodiment comprises an upper manipulation threshold setting register 61 and a lower manipulation threshold setting register 62 in which the respective upper manipulation threshold and lower manipulation threshold are set. In addition, the motor control device 50 comprises a high load switching time setting register 63, and a normal load switching time setting register 64. In the high load switching time setting register 63, the high load switching time is set which is the time basis for determining whether the load amount is increased to the high load level when the normal load observer is selected. In the normal load switching time setting register 64, the normal load switching time is set which is the time basis for determining whether the load amount is decreased to the normal load level when the high load observer is selected.

Moreover, the motor control device 50 comprises a state feedback gain table setting register 66 and an integral gain table setting register 66, which store the control gains corresponding to the respective observers. In the state feedback gain table setting register 65, a state feedback gain F1_1 which corresponds to the normal load observer and a state feedback gain F1_2 which corresponds to the high load observer are set. In the integral gain table setting register 66, an integral gain F2_1 which corresponds to the normal load observer and an integral gain F2_2 which corresponds to the high load observer are set.

Based on the determination (instructions for selection) on the load level by a table switching determiner 54, a state feedback gain selector 55 and an integral gain selector 56 respectively select gains corresponding to the type of the observers (i.e., corresponding to the load level) and output the gains to the feedback calculator 20.

Figure 18:
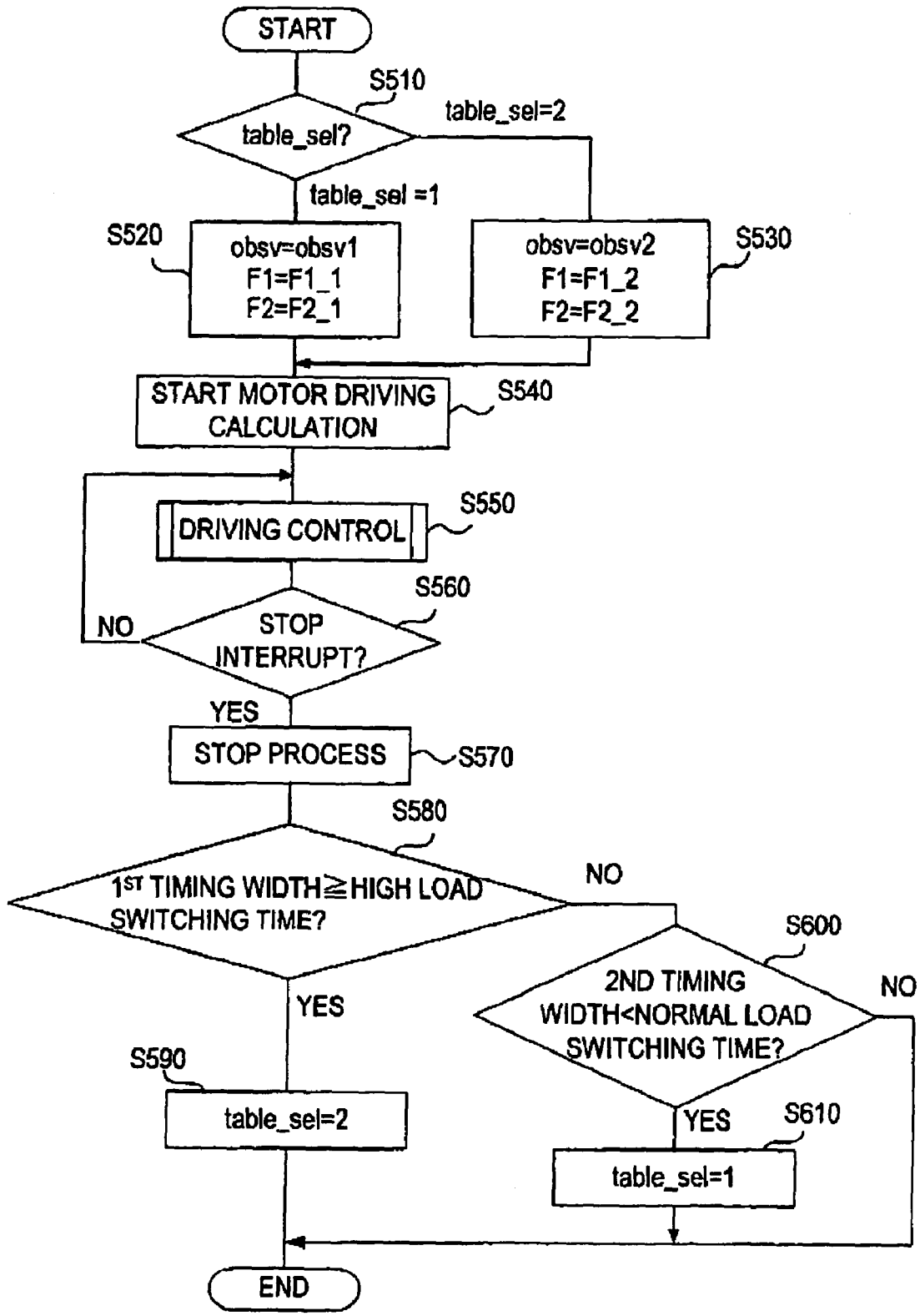
FIG. 18 is a flowchart showing a motor control process executed by an ASIC of the second embodiment.
Figure 19:
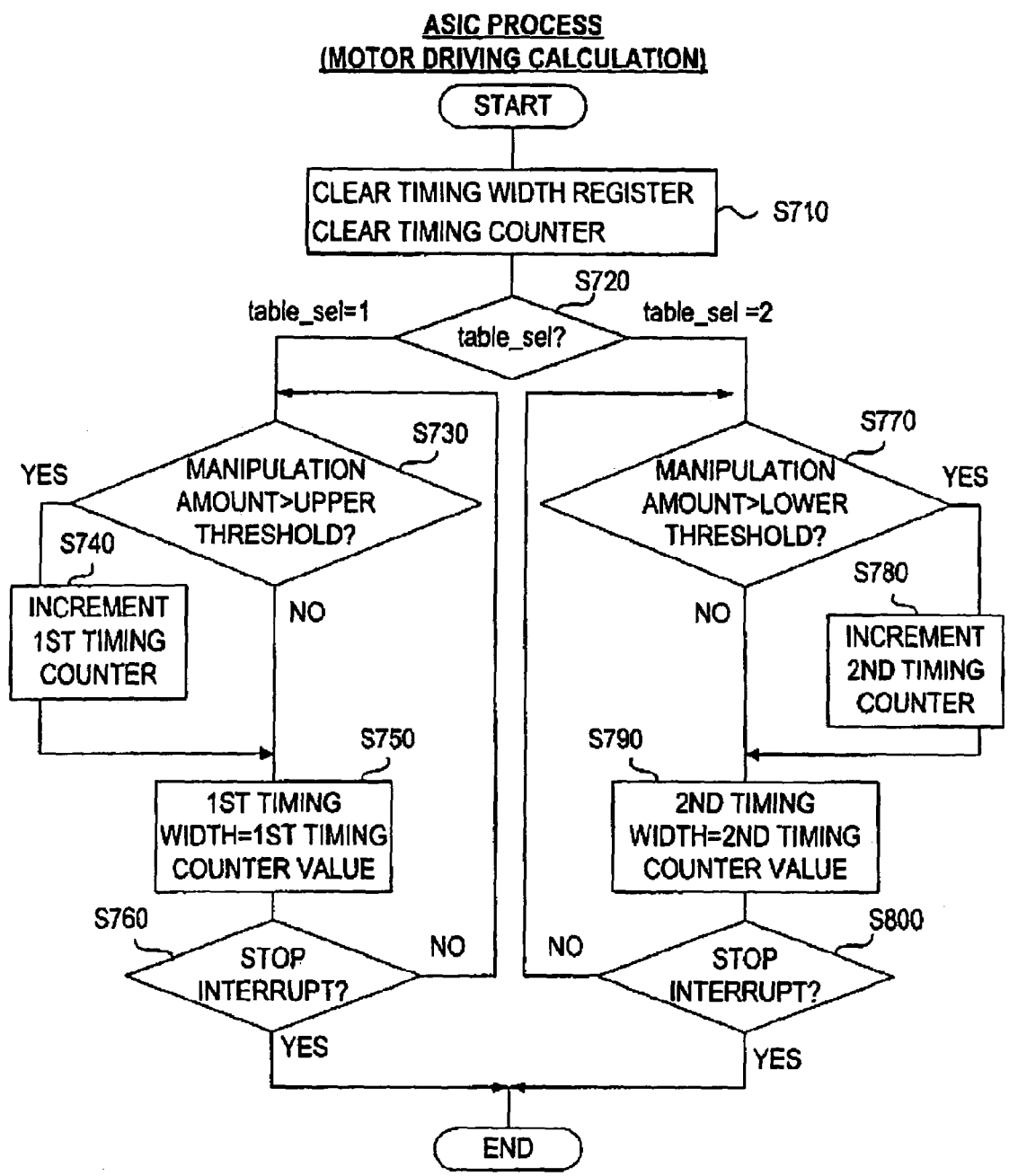
FIG. 19 is a flowchart showing a motor driving calculation process in S540 of the motor control process in FIG. 18.

A process executed in an ASIC 52 of the motor control device 50 is explained by way of FIGS. 18 and 19. FIG. 18 is a flowchart showing a motor control process performed by the ASIC 52. When the start setting register 31 is set by the process of a CPU 51, the ASIC 12 starts the control process. The set value in table_sel is determined in S510. In the present embodiment, the normal load observer and the corresponding control gains (state feedback gain F1_1 and integral gain F2_1) are selected by default. Therefore, since table_sel=1, the process moves to S520.

In S520, the normal load observer matrix obsv1 is set to the observer matrix obsv, the normal load gain F1_1 is set to the state feedback gain F1, and the normal load gain F2_1 is set to the integral gain F2. Thereby, the state estimator OBS and the respective control gains are set for the normal load level. The motor driving calculation is started in S540, and the driving control of the motor 7 is started in S550. The stop S550 is the same as S250 in FIG. 12. It is negatively determined in S560 until the conveying roller 4 reaches the target stop position r and stops, that is, until the stop interrupt signal is outputted. When the conveying roller 4 is rotated to the target stop position r and stops, the process moves to S570 to perform the termination process.

Details of the motor driving calculation started in S540 are as shown in FIG. 19. A timing width register 57 and a timing counter 58 are cleared in S710. It is determined in S720 which observer is currently selected. If the normal load observer is selected, the process moves to S730. If the high load observer is selected, the process moves to S770.

When the process moves to S730, it is determined whether the manipulation amount u is larger than the upper manipulation threshold. If positively determined, a first timing counter (not shown) is incremented in S740, and the process moves to S750. A count value of the first timing counter is set to a first timing width register (not shown) in S750. It is determined in S760 whether stop interrupt has occurred. If positively determined, the motor driving calculation process is ended. Otherwise, the steps of S730 and afterward, that is, whether the manipulation amount u exceeds the upper manipulation threshold, are repeated.

Conversely, when the process moves to S770, it is determined whether the manipulation amount u is larger than the lower manipulation threshold. If positively determined, a second timing counter (not shown) is incremented in S780, and the process moves to S790. A count value of the second timing counter is set to a second timing width register (not shown) in S790. It is determined in S800 whether stop interrupt has occurred. If positively determined, the motor driving calculation process is ended. Otherwise, the steps of S770 and afterward, that is, whether the manipulation amount u exceeds the lower manipulation threshold, are repeated.

Both the first timing width register and the second timing width register are provided in the timing width register 57 shown in FIG. 17. Both the first timing counter and the second timing counter are provided in the timing counter 58 shown in FIG. 17.

When the conveying roller 4 stops after the completion of one forwarding operation, steps of S580 and afterwards are performed before the next forwarding operation is started. That is, it is determined whether the count value in the first timing counter set in the first timing width register, i.e., the period in which the manipulation amount u exceeds the upper manipulation threshold, is equal to or more than the high load switching time set in the high load switching time setting register 63. If positively determined, it is determined that the load amount of the motor 7 is increased to be in a range of the high load level. In S590, "2" is set to table_sel. Thereby, the high load observer and the corresponding control gains are used in the next forwarding operation.

If it is negatively determined in S580, it is determined whether the count value in the second timing counter set in the second timing width register, that is, the period in which the manipulation amount u exceeds the lower manipulation threshold, is shorter than the normal load switching time set in the normal load switching time setting register 64 in S600. If negatively determined, the process is ended. Otherwise, "1" is set to table_sel in S610.

[Third Embodiment]

In the first and second embodiments, the load of the motor 7 is determined (estimated) based on the manipulation amount u. However, the load of the motor 7 is varied depending on the ambient temperature, for example. In the present embodiment, the load is determined based on the ambient temperature instead of the manipulation amount u. It is assumed that the lower the ambient temperature is, the heavier the load of the motor 7 becomes. Therefore, when the ambient temperature is higher than a predetermined temperature threshold, the normal load observer is selected. When the ambient temperature is lower than the predetermined temperature, the normal load observer is switched to the high load observer.

Figure 20:
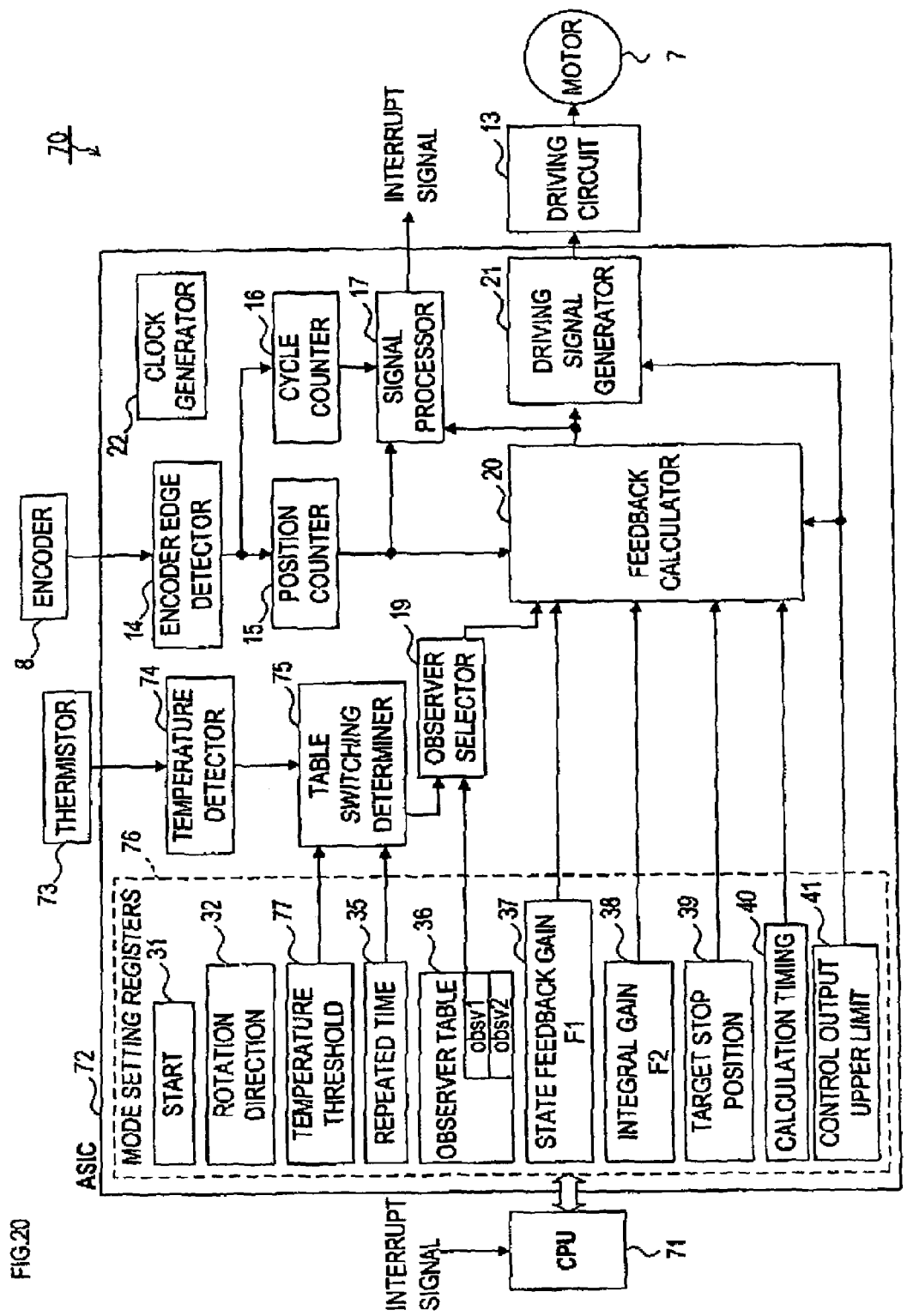
FIG. 20 is a block diagram showing a schematic constitution of a motor control device of a third embodiment.

As shown in FIG. 20, a motor control device 70 of the present embodiment which performs the above switching comprises a thermistor 73 that outputs a sensor signal corresponding to the ambient temperature, and a temperature detector 74 that detects the ambient temperature based on the sensor signal from the thermistor 73. In mode setting registers 76, a temperature threshold setting register 77 is provided that sets a temperature threshold which is the basis for determining the load level. The load amount (load level) of the motor 7 is determined by comparing the temperature threshold and a temperature detected by the temperature detector 74, so that the observer corresponding to the load amount is selected. Other components in FIG. 20 are the same as the components of the motor control apparatus 10 of the first embodiment in FIG. 3. The same reference numbers are given to the same components.

Figure 21:
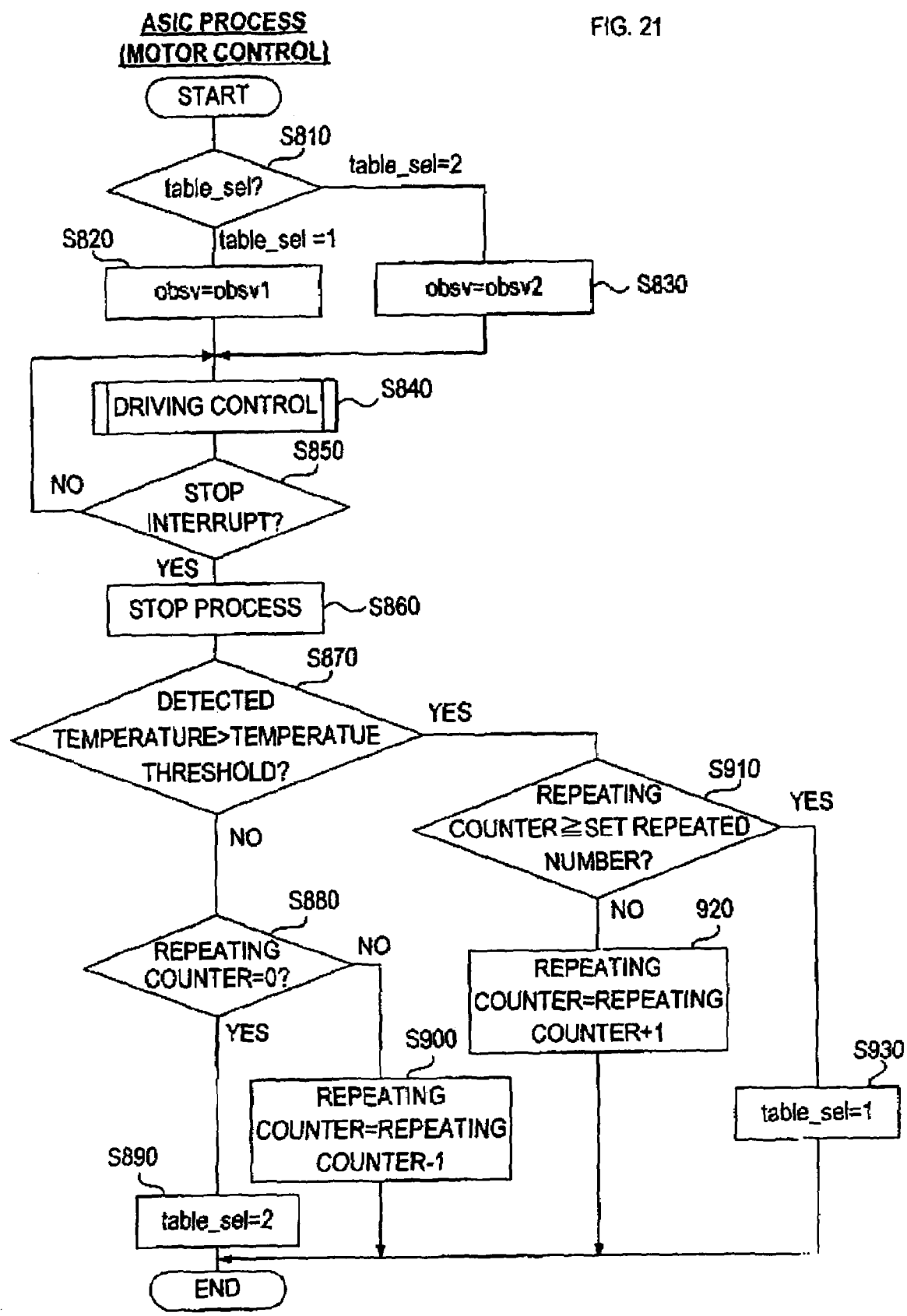
FIG. 21 is a flowchart showing a motor control process performed by an ASIC of the third embodiment.

A motor control process executed in an ASIC 72 of the motor control device 70 of the present embodiment constituted as above is as shown in FIG. 21. The motor control process in FIG. 21 is basically the same with the motor control process in FIG. 12 performed in the motor control apparatus 10 of the first embodiment. Steps from S810 to S860 in FIG. 21 are totally the same with the steps from S210 to S270 excluding the step of 8240. Also, steps from S880 to S930 in FIG. 21 are totally the same with the steps from S290 to S340. In the present embodiment, after the termination process in S860, it is determined in S870 whether the temperature detected by the temperature detector 74 is higher than the temperature threshold set in the temperature threshold setting register 77. If positively determined, the process moves to S910. Otherwise, the process moves to S880.

If the number of times it is determined the detected temperature is higher is equal to or more than a predetermined repeated number, the observer is switched to the normal load observer (S930). If the number of times the detected temperature is higher is less than a predetermined repeated number and the count value in the repeating counter, the observer is switched to the high load observer (S300).

In the present embodiment, only the observer is switched depending on the ambient temperature. However, both the observer and the control gains can be switched as in the second embodiment.

[Variations]

In the above, preferred embodiments of the present invention are described. However, the present invention is not limited to the above described embodiments. The present invention can be practiced in various manners without departing from the technical scope of the invention.

For example, three or more levels may be provided for indicating the load level, and the observer (and the control gains) may be configured for the respective level.

In the motor control process of the second embodiment, if the first timing width is equal to or more than the high load switching time, "2" is immediately set to table_sel. If the second timing width is less than the normal load switching time, "1" is immediately set to table_sel. However, the motor control process of the second embodiment may use the repeating counter as in the first embodiment.

For example, the number of times positively determined in S580 is counted. When the number of times is equal to or more than a predetermined count value, S590 is performed. Or, the number of times positively determined in S600 is counted. When the number of times is equal to or more than a predetermined count value, S610 is performed.

Conversely, the motor control process of the third embodiment may omit the use of the counter. That is, the steps S880, S900, S910, and S920 may be skipped.

Moreover, the actual load amount of the motor may be estimated based on the current value of the current passing the motor, for example. Any physical amount and data can be used as long as the load amount is properly estimated in a direct or indirect manner.

Figure 22:
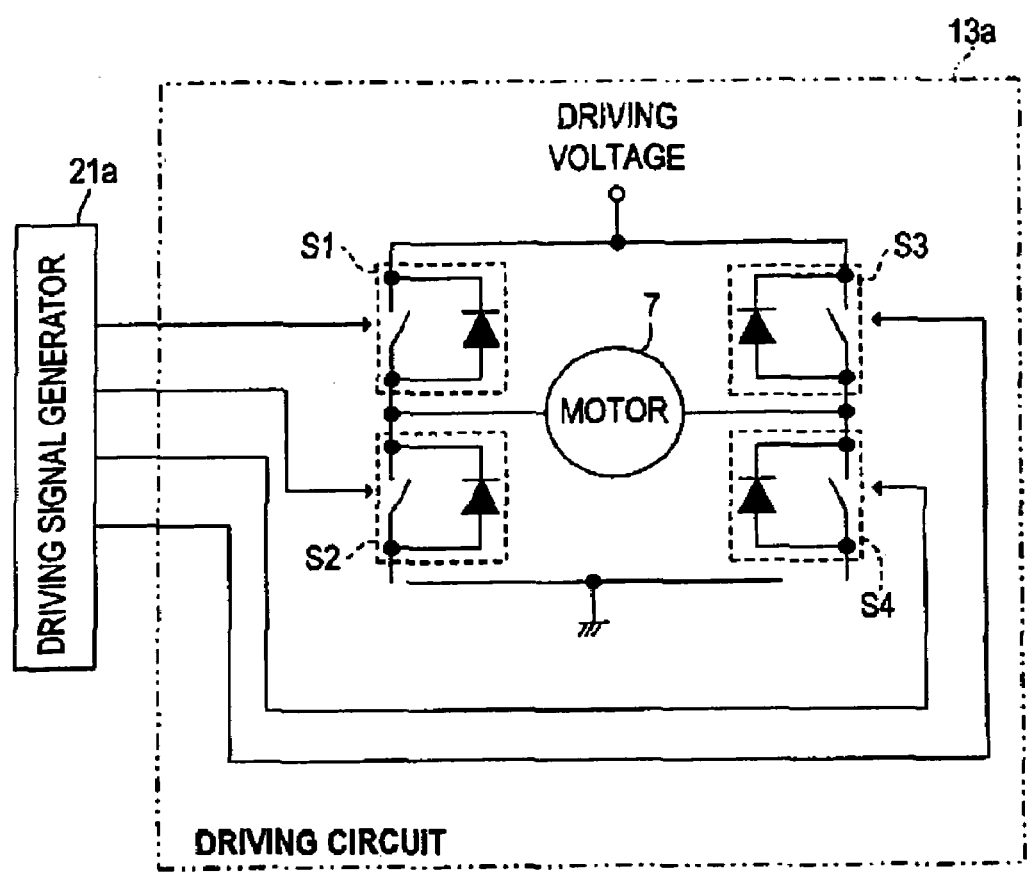
FIG. 22 is an explanatory view showing a variation of the driving circuit.

In addition, a driving circuit 13a in FIG. 22 may be used as the driving circuit for directly driving the motor 7.

In the driving circuit 13a, an H-bridge circuit is constituted by four switching elements S1 to S4. In this case, a driving signal generator 21a generates a PWM signal for controlling on and off of the respective switching elements S1 to S4 according to the control signal (manipulation amount u) from the feedback calculator 20 and the set value in the rotation direction setting register 32. The driving circuit 13a controls on and off of the respective switching elements S1 to S4 based on the PWM signal so as to drive the motor 7. The switching elements S1 to S4 are semiconductor switching elements such as FET.

What is claimed is:

1. A motor control device comprising:
a target setting unit that sets a target operation amount of a DC motor or a driving target driven by the DC motor;
a detecting unit that detects an actual operation amount corresponding to the target operation amount, of the DC motor or the driving target;
a controlling unit that controls the DC motor by calculating a manipulation amount of the DC motor required to conform the actual operation amount to the target operation amount and outputting a control signal which indicates the manipulation amount to the DC motor,
estimation units that are respectively provided for a plurality of load levels in a fluctuation range of an estimated load amount of the DC motor, and that estimate a state quantity indicating an operating state of at least one of the DC motor or the driving target based on the actual operation amount detected by the detecting unit and the calculated manipulation amount, assuming that the load amount of the DC motor belongs to the corresponding load level,
a switching unit that obtains actual load information indicating an actual load amount of the DC motor in a direct or indirect manner, and selectively performs switching to one of the estimation units, which is provided for the load level corresponding to the load amount indicated by the actual load information, wherein
the controlling unit calculates the manipulation amount based on the target operation amount, the actual operation amount, and the state quantity estimated by the estimation unit selected by the switching unit.

2. The motor control device according to claim 1, wherein the switching unit comprises a load level determination unit that determines which one of the plurality of load levels the load amount indicated by the actual load information belongs to, and performs switching to the target estimation unit provided for the load level which it is determined by the load level determination unit the load amount belongs to.

3. The motor control device according to claim 2, wherein corresponding control gains used when the controlling unit calculates the manipulation amount are respectively provided for the respective estimation units,
the controlling unit is designed to use one of the control gains to calculate the manipulation amount, and
the switching unit, when performing switching to the target estimation unit, also performs switching of the control gain for use by the controlling unit to the target control gain provided for the target estimation unit.

4. The motor control device according to claim 2, wherein the actual load information is the manipulation amount, corresponding manipulation thresholds are respectively provided for respective border sections between the two adjacent load levels, so that whether there is a shift of the load level which the load amount of the DC motor belongs to can be determined based on the manipulation amount, and
the load level determination unit compares the manipulation amount calculated in the controlling unit and the respective manipulation thresholds so as to perform a determination on which load level the load amount of the DC motor belongs to.

5. The motor control device according to claim 3, wherein the actual load information is the manipulation amount, corresponding manipulation thresholds are respectively provided for respective border sections between the two adjacent load levels, so that whether there is a shift of the load level which the load amount of the DC motor belongs to can be determined based on the manipulation amount, and
the load level determination unit compares the manipulation amount calculated in the controlling unit and the respective manipulation thresholds so as to perform the determination on which load level the load amount of the DC motor belongs to.

6. The motor control device according to claim 4, wherein the load level determination unit comprises a manipulation amount determination unit that determines whether the manipulation amount exceeds the manipulation threshold provided for the border section between the load level of the currently selected estimation unit and the adjacent upper load level, a timing unit that times, per, each preset determination period, a period in which it is determined by the manipulation amount determination unit that the manipulation amount exceeds the manipulation threshold, and a timing determination unit that determines that the load amount corresponds to the upper load level when the period timed by the timing unit is equal to or more than a predetermined switching determination time.

7. The motor control device according to claim 6, wherein the timing determination unit determines whether the timed period exceeds the switching determination time for every determination period, and when the number of times which it is determined that the timed period exceeds the switching determination time is equal to or more than a predetermined switching determination number, determines that the load amount belongs to the upper load level.

8. The motor control device according to claim 4, wherein the load level determination unit comprises a manipulation amount determination unit that determines whether the manipulation amount exceeds the manipulation threshold provided for the border section between the load level of the currently selected estimation unit and the adjacent lower load level, a timing unit that times, per each preset determination period, a period in which it is determined by the manipulation amount determination unit that the manipulation amount exceeds the manipulation threshold, and a timing determination unit that determines that the load amount corresponds to the lower load level when the period timed by the timing unit is less than a predetermined switching determination time.

9. The motor control device according to claim 8, wherein the timing determination unit determines whether the timed period exceeds the switching determination time for every determination period, and when the number of times which it is determined that the timed period exceeds the switching determination time is less than a predetermined switching determination number, determines that the load amount belongs to the lower load level.

10. The motor control device according to claim 5, wherein
each of the manipulation thresholds is composed of an upper threshold for determining that the load level which the load amount belongs to has moved up one level and a lower threshold, that is smaller than the upper threshold by a predetermined amount, for determining that the load level has moved down one level,
the load level determination unit comprises an increase determination unit that determines whether the manipulation amount exceeds the upper threshold provided for the border section between the load level corresponding to the currently selected estimation unit and the adjacent upper load level, a decrease determination unit that determines whether the manipulation amount exceeds the lower threshold provided for the border section between the load level corresponding to the currently selected estimation unit and the adjacent lower load level, a timing unit that times, per the preset determination period, one of an upper period in which the increase determination unit determines that the manipulation amount exceeds the upper threshold and a lower period in which the decrease determination unit determines that the manipulation amount exceeds the lower threshold, and a timing determination unit that determines that the load amount belongs to the upper load level when the upper period timed by the timing unit is equal to or more than a predetermined upper switching period, and that the load amount belongs to the lower load level when the lower period timed by the timing unit is less than a predetermined lower switching period.

11. The motor control device according to claim 10, wherein the timing determination unit determines, per the determination period, one of whether the timed period is equal to or more than the upper switching period and whether the timed period is equal to or more than the lower switching period, when the number of times it is determined that the timed period is equal to or more than the upper switching period, is no less than a predetermined switching determination number, the timing determination unit determines that the load amount belongs to the upper load level, and when the number of times it is determined that the timed period is less than the lower switching period, is no less than a predetermined switching determination number, the timing determination period determines that the load amount belongs to the lower load level.

12. The motor control device according to claim 6, wherein the timing by the timing unit is performed in an accumulated manner in the determination period.

13. The motor control device according to claim 6, wherein the determination period is a period in which a predetermined unit operation is performed from a start to a stop of the driving target when the driving target is driven by the DC motor.

14. The motor control device according to claim 2, further comprising a temperature detecting unit that detects an ambient temperature of the driving target as the actual load information, corresponding temperature thresholds are respectively provided for respective border sections of between the two adjacent load levels, so that whether there is a shift of the load level which the load amount of the DC motor belongs to can be determined based, on the ambient temperature, and the load level determination unit compares the ambient temperature detected by the temperature detecting unit to the respective temperature thresholds so as to perform a determination on which load level the load amount of the DC motor belongs to.

15. The motor control device according to claim 3, further comprising a temperature detecting unit that detects an ambient temperature of the driving target as the actual load information, corresponding temperature thresholds are respectively provided for respective border sections between the two adjacent load levels, so that whether there is a shift of the load level which the load amount of the DC motor belongs to can be determined based on the ambient temperature, and the load level determination unit compares the ambient temperature detected by the temperature detecting unit to the respective temperature thresholds so as to perform a determination on which load level the load amount of the DC motor belongs to.

16. The motor control device according to claim 14, wherein the driving target is a rotator, the target operation amount is the target rotation amount of the rotator, and the actual operation amount is the actual rotation amount of the rotator.

17. The motor control device according to claim 15, wherein the driving target is a rotator, the target operation amount is the target rotation amount of the rotator, and the actual operation amount is the actual rotation amount of the rotator.

* * * * *